(12) United States Patent
Goel et al.

(10) Patent No.: US 12,229,057 B2
(45) Date of Patent: Feb. 18, 2025

(54) METHOD AND APPARATUS FOR SELECTING DATA ACCESS METHOD IN A HETEROGENEOUS PROCESSING SYSTEM WITH MULTIPLE PROCESSORS

(71) Applicant: SambaNova Systems, Inc., Palo Alto, CA (US)

(72) Inventors: Arnav Goel, Palo Alto, CA (US); Neal Sanghvi, Palo Alto, CA (US); Jiayu Bai, Palo Alto, CA (US); Qi Zheng, Palo Alto, CA (US); Ravinder Kumar, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 92 days.

(21) Appl. No.: 18/099,032

(22) Filed: Jan. 19, 2023

(65) Prior Publication Data
US 2024/0248855 A1 Jul. 25, 2024

(51) Int. Cl.
*G06F 13/16* (2006.01)
*G06F 12/1036* (2016.01)

(52) U.S. Cl.
CPC ...... *G06F 12/1036* (2013.01); *G06F 13/1668* (2013.01); *G06F 2212/657* (2013.01)

(58) Field of Classification Search
CPC ............ G06F 12/1036; G06F 13/1668; G06F 2212/657
(Continued)

(56) References Cited

U.S. PATENT DOCUMENTS

| 5,301,287 A | 4/1994 | Herrell et al. |
| 5,684,980 A | 11/1997 | Casselman |

(Continued)

FOREIGN PATENT DOCUMENTS

| EP | 1372084 A2 | 12/2003 |
| JP | 2020112901 A | 7/2020 |

(Continued)

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Christopher B Shin
(74) *Attorney, Agent, or Firm* — Flagship Patents; Sikander M. Khan; Bruce A. Young

(57) ABSTRACT

A heterogeneous processing system including a host processor coupled to a host memory, a first processor coupled to a first memory, a second processor coupled to a second memory, multiple data transfer resources, and switch and bus circuitry that communicatively couples the host processor, the first processor, the second processor, and the data transfer resources. The host processor is configured to detect an application for execution by both the first processor and the second processor, to select one of multiple data transfer methods for transferring data between the first and second processors, and to configure the heterogeneous processing system based on the selected data transfer method. The data transfer methods include memory extension operation, one memory to memory transfer operation, and two memory to memory transfer operation using at least one intermediate host buffer.

20 Claims, 16 Drawing Sheets

(58) Field of Classification Search
USPC .......................................................... 710/22
See application file for complete search history.

(56) References Cited

U.S. PATENT DOCUMENTS

| | | | |
|---|---|---|---|
| 6,470,485 B1 | 10/2002 | Cote et al. | |
| 6,539,438 B1 | 3/2003 | Ledzius et al. | |
| 6,557,156 B1 | 4/2003 | Guccione | |
| 6,667,983 B1 | 12/2003 | Lo et al. | |
| 7,707,392 B2 | 4/2010 | Maeda et al. | |
| 8,244,930 B1 | 8/2012 | Dykema et al. | |
| 9,009,723 B2 | 4/2015 | Degenaro et al. | |
| 9,288,101 B1* | 3/2016 | Dalal | G06F 13/16 |
| 9,300,574 B2 | 3/2016 | Ditya | |
| 9,501,325 B2 | 11/2016 | Pell et al. | |
| 9,715,475 B2 | 7/2017 | Lavasani | |
| 9,875,167 B1* | 1/2018 | Norrie | G06F 11/3636 |
| 10,031,857 B2 | 7/2018 | Menachem et al. | |
| 10,318,475 B2* | 6/2019 | Kaimalettu | H04L 67/1008 |
| 10,511,479 B2 | 12/2019 | Xie et al. | |
| 10,558,496 B2* | 2/2020 | Apodaca | G06F 9/5016 |
| 10,613,881 B2 | 4/2020 | Lee et al. | |
| 10,621,138 B2 | 4/2020 | Hu et al. | |
| 10,802,870 B2 | 10/2020 | Lu | |
| 10,831,507 B2 | 11/2020 | Shah et al. | |
| 10,831,523 B2 | 11/2020 | Kochevar-Cureton et al. | |
| 10,838,895 B2 | 11/2020 | Yu et al. | |
| 10,841,243 B2 | 11/2020 | Levi et al. | |
| 10,877,822 B1 | 12/2020 | Wang et al. | |
| 10,936,533 B2 | 3/2021 | LeBeane et al. | |
| 11,068,780 B2 | 7/2021 | Mellempudi et al. | |
| 11,080,227 B2 | 8/2021 | Koeplinger et al. | |
| 11,182,221 B1* | 11/2021 | Sivaramakrishnan | G06F 30/34 |
| 11,182,264 B1 | 11/2021 | Sivaramakrishnan et al. | |
| 11,184,439 B2 | 11/2021 | Eran et al. | |
| 11,200,096 B1 | 12/2021 | Shenbagam et al. | |
| 11,237,880 B1 | 2/2022 | Raumann et al. | |
| 11,328,207 B2 | 5/2022 | Lauterbach et al. | |
| 11,328,208 B2 | 5/2022 | Lie et al. | |
| 11,347,965 B2 | 5/2022 | Dutta et al. | |
| 11,360,800 B2 | 6/2022 | Kochevar-Cureton et al. | |
| 11,392,740 B2 | 7/2022 | Raumann et al. | |
| 11,436,400 B2 | 9/2022 | Liao et al. | |
| 11,436,429 B2 | 9/2022 | Jaganathan et al. | |
| 11,487,694 B1* | 11/2022 | Misra | G06F 9/5077 |
| 11,568,218 B2 | 1/2023 | Ng et al. | |
| 11,609,798 B2 | 3/2023 | Sivaramakrishnan et al. | |
| 11,625,283 B2 | 4/2023 | Sivaramakrishnan et al. | |
| 11,625,284 B2 | 4/2023 | Sivaramakrishnan et al. | |
| 11,687,264 B2 | 6/2023 | Chang et al. | |
| 11,847,395 B2 | 12/2023 | Raumann et al. | |
| 11,886,930 B2 | 1/2024 | Sivaramakrishnan et al. | |
| 11,886,931 B2 | 1/2024 | Sivaramakrishnan et al. | |
| 11,893,424 B2 | 2/2024 | Raumann et al. | |
| 2002/0156998 A1 | 10/2002 | Casselman | |
| 2003/0108119 A1 | 6/2003 | Mohebbi et al. | |
| 2004/0039980 A1* | 2/2004 | Zak | H04L 69/12 714/758 |
| 2006/0012395 A1 | 1/2006 | Huppenthal et al. | |
| 2007/0186126 A1 | 8/2007 | Smith et al. | |
| 2007/0220522 A1 | 9/2007 | Coene et al. | |
| 2008/0013448 A1 | 1/2008 | Horie et al. | |
| 2009/0089475 A1 | 4/2009 | Chitlur | |
| 2009/0172351 A1 | 7/2009 | Vorbach et al. | |
| 2009/0300209 A1 | 12/2009 | Elzur | |
| 2012/0303932 A1 | 11/2012 | Farabet et al. | |
| 2014/0137123 A1 | 5/2014 | Hartmann et al. | |
| 2014/0258438 A1 | 9/2014 | Ayoub et al. | |
| 2015/0058614 A1 | 2/2015 | Degenaro et al. | |
| 2015/0100971 A1 | 4/2015 | Dube et al. | |
| 2016/0077976 A1 | 3/2016 | Raikin et al. | |
| 2016/0308719 A1 | 10/2016 | Putnam et al. | |
| 2016/0314025 A1 | 10/2016 | Mcgarry et al. | |
| 2017/0147228 A1* | 5/2017 | Yudanov | G06F 13/4022 |
| 2017/0262291 A1* | 9/2017 | Lai | G06F 9/50 |
| 2017/0317679 A1 | 11/2017 | Suh et al. | |
| 2018/0026916 A1 | 1/2018 | Banerjee et al. | |
| 2018/0225403 A1 | 8/2018 | Nicol et al. | |
| 2018/0285295 A1 | 10/2018 | Abel et al. | |
| 2018/0307950 A1 | 10/2018 | Nealis et al. | |
| 2018/0308200 A1 | 10/2018 | Surti et al. | |
| 2018/0314941 A1 | 11/2018 | Lie et al. | |
| 2018/0315158 A1 | 11/2018 | Nurvitadhi et al. | |
| 2019/0089616 A1 | 3/2019 | Chabbi et al. | |
| 2019/0138890 A1 | 5/2019 | Liang et al. | |
| 2019/0171604 A1 | 6/2019 | Brewer | |
| 2019/0171612 A1 | 6/2019 | Shahar et al. | |
| 2019/0180176 A1 | 6/2019 | Yudanov et al. | |
| 2019/0243571 A1 | 8/2019 | Narayanan et al. | |
| 2019/0258921 A1 | 8/2019 | Lie et al. | |
| 2019/0286973 A1 | 9/2019 | Kovvuri et al. | |
| 2019/0384642 A1 | 12/2019 | Bolkhovitin et al. | |
| 2020/0090313 A1 | 3/2020 | Bugdary et al. | |
| 2020/0142753 A1 | 5/2020 | Harwood et al. | |
| 2020/0142857 A1 | 5/2020 | Catiller et al. | |
| 2020/0151573 A1 | 5/2020 | Das et al. | |
| 2020/0174840 A1 | 6/2020 | Zhao et al. | |
| 2020/0226444 A1 | 7/2020 | Sharma et al. | |
| 2020/0264876 A1 | 8/2020 | Lo et al. | |
| 2020/0314181 A1 | 10/2020 | Eran et al. | |
| 2020/0326992 A1 | 10/2020 | Jin et al. | |
| 2021/0011770 A1 | 1/2021 | Prabhakar et al. | |
| 2021/0073625 A1 | 3/2021 | Cai | |
| 2021/0089343 A1 | 3/2021 | Hyoudou | |
| 2021/0097366 A1 | 4/2021 | Wagner et al. | |
| 2021/0097379 A1 | 4/2021 | Yang et al. | |
| 2021/0103820 A1 | 4/2021 | Ghosh | |
| 2021/0125058 A1 | 4/2021 | Chowdhury et al. | |
| 2021/0192287 A1 | 6/2021 | Dwivedi et al. | |
| 2021/0192357 A1 | 6/2021 | Sinha et al. | |
| 2021/0192358 A1 | 6/2021 | Song et al. | |
| 2021/0200610 A1 | 7/2021 | Chu et al. | |
| 2021/0241093 A1 | 8/2021 | Byrne et al. | |
| 2021/0306142 A1 | 9/2021 | Willis et al. | |
| 2021/0373867 A1 | 12/2021 | Chen et al. | |
| 2021/0374503 A1 | 12/2021 | Kim et al. | |
| 2022/0058034 A1 | 2/2022 | Grohoski et al. | |
| 2022/0197712 A1 | 6/2022 | Sivaramakrishnan et al. | |
| 2022/0197713 A1* | 6/2022 | Sivaramakrishnan | G06F 9/5027 |
| 2022/0198117 A1 | 6/2022 | Raumann et al. | |
| 2022/0269534 A1* | 8/2022 | Misra | G06F 15/7875 |
| 2023/0128529 A1 | 4/2023 | Zeng et al. | |
| 2023/0195478 A1* | 6/2023 | Brot | G06F 9/3004 713/100 |
| 2023/0205585 A1* | 6/2023 | Chatterjee | G06F 9/5016 718/104 |
| 2024/0248853 A1 | 7/2024 | Goel et al. | |
| 2024/0248860 A1 | 7/2024 | Goel et al. | |
| 2024/0248863 A1 | 7/2024 | Goel et al. | |

FOREIGN PATENT DOCUMENTS

| | | |
|---|---|---|
| TW | 202240386 A | 10/2022 |
| TW | 202240394 A | 10/2022 |
| TW | 202248853 A | 12/2022 |
| WO | 2010142987 A1 | 12/2010 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

U.S. Appl. No. 18/099,006—Non-Final Rejection, dated May 24, 2024, 9 pages.

(56) References Cited

OTHER PUBLICATIONS

U.S. Appl. No. 18/099,014—Non-Final Rejection, dated Apr. 11, 2024, 12 pages.
U.S. Appl. No. 18/099,021—Non-Final Rejection, dated Mar. 7, 2024, 12 pages.
U.S. Appl. No. 18/099,021—Notice of Allowance, dated Jun. 6, 2024, 9 pages.
Accelerated Computing with a Reconfigurable Dataflow Architecture, SambaNova Systems Whitepaper, 10 pages, Dated 2021.
Bae et al., Auto-Tuning CNNs for Coarse-Grained Reconfigurable Array-based Accelerators, IEEE Transactions on Computer-Aided Design of Integrated Circuits and Systems, vol. 37, Issue: 11, Nov. 2018, 10 pages.
Busa et al., A Run-Time Word-Level Reconfigurable Coarse-Grain Functional Unit for a VLIW processor; ACM 2002, pp. 44-49. (Year: 2002).
Donges, Gradient Descent: An Introduction to Machine Learning's Most Popular Algorithms, dated Jun. 16, 2019, 10 pages. Retrieved on Mar. 24, 2021, retrieved from [URL: https://builtin.com/data-science/gradient-descent ].
Éricles Sousa, A reconfigurable memory architecture for system integration of coarse-grained reconfigurable arrays, Published in: 2017 International Conference on ReConFigurable Computing and FPGAs (ReConFig) Dec. 4-6, 2017 https://ieeexplore.IEEE.org/document/8279768 (Year: 2017).
Galanis et al., Accelerating Applications by Mapping Critical Kernels on Coarse-Grain Reconfigurable Hardware in Hybrid Systems, Field-Programmable Custom Computing Machines, 2005, 13th Annual IEEE Symposium on Napa, CA Apr. 2005, 2 pages.
Galanis et al., Partitioning Methodology for Heterogeneous Reconfigurable Functional Units, The Journal of Supercomputing, vol. 38, No. 1, dated Oct. 1, 2006, 18 pages.
Iqbal et al., Reconfigurable Processor Architecture for High Speed Applications, IEEE, dated 2009, pp. 624-629.
Zhang et al., Dive into Deep Learning, Release 0.16.2, dated Mar. 20, 2021, 1027 pages.
Jafri et al., NeuroCGRA: A CGRAs with Support for Neural Networks, 2014 International Conference on High Performance Computing & Simulation (HPCS), 8 pages.
Jin et al., How to scale distributed deep learning, dated Nov. 14, 2016, 16 pages.
Kachris et al.; "A Survey on Reconfigurable Accelerators for Cloud Computing", IEEE 2016, Aug. 29, 2016, pp. 1-11.
Knodel, Oliver, et al., "RC3E: Reconfigurable Accelerators in Data Centers and their Provision by Adapted Service Models", IEEE 9th International Converence on Cloud Computing, 2016, pp. 1-8.
Lecture 11: Distributed Training and Communication Protocols, CSE599W: Spring 2018, UW Paul G. Allen School of Computer Science and Engineering, 41 pages.
Li, et al., "Caterpillar: Coarse Grain Reconfigurable Architecture for Accelerating the Training of Deep Neural Networks," arXiv: 1706.00517v2 [cs.DC], Jun. 8, 2017, 10 pages.
Liang et al., Dynamic Coarse Grain Dataflow Reconfiguration Technique for Real-Time Systems, IEEE, dated 2005, pp. 3511-3514.
Liu et. al., Offloading distributed Applications onto SmartNICs using iPipe, ACM 2019, pp. 1-16.
Ma et al., DeepGauge: Multi-Granularity Testing Criteria for Deep Learning Systems; ACM 2018, pp. 1-12.
Mao, Data Parallelism vs Model Parallelism in Distributed Deep Learning Training, dated Mar. 23, 2019, 4 pages, retrieved on Mar. 30, 2021, Retrieved from the internet [ URL: https://leimao.github.io].
Marshall, Dave, "Remote Procedure Calls (RPC)", Jan. 5, 1999, 15 pages, Retreived from URL.
Padole et al., Configuration Memory Based Dynamic Coarse Grained Reconfigurable Multicore Architecture, IEEE 2013, pp. 3511-3514, 5 pages.
Paek et al., "Binary Acceleration Using Coarse-Grained Reconfigurable Architecture," ACM SIGARCH Computer Architecture News, vol. 38, No. 4, Sep. 2010, 7 pages.
Rubattu et al., Dataflow-Functional High-Level Synthesis for Coarse-Grained Reconfigurable Accelerators, IEEE 2019, pp. 69-72 (Year: 2019).
Ruder, An overview of gradient descent optimization algorithms, NUI Galway Aylien Lyd, dated Jun. 15, 2017, 14 pages.
Tanaka et. al., Distributed Deep Learning with GPU-FPGA heterogenous computing, IEEE 2021, 9 pages.
Xiandong Qi, Introduction to Distributed Deep Learning, dated May 13, 2017, 13 pages.

* cited by examiner (For FIG. 2, see next page)

METHOD AND APPARATUS FOR SELECTING DATA ACCESS METHOD IN A HETEROGENEOUS PROCESSING SYSTEM WITH MULTIPLE PROCESSORS

RELATED APPLICATIONS

This application is related to US Nonprovisional Patent Application titled "METHOD AND APPARATUS FOR DATA TRANSFER BETWEEN ACCESSIBLE MEMORIES OF MULTIPLE PROCESSORS IN A HETEROGENEOUS PROCESSING SYSTEM USING TWO MEMORY TO MEMORY TRANSFER OPERATIONS" (SBNV1165USN01), filed contemporaneously. The related application is hereby incorporated by reference for all purposes.

This application is related to US Nonprovisional Patent Application titled "METHOD AND APPARATUS FOR DATA TRANSFER BETWEEN ACCESSIBLE MEMORIES OF MULTIPLE PROCESSORS IN A HETEROGENEOUS PROCESSING SYSTEM USING ONE MEMORY TO MEMORY TRANSFER OPERATION" (SBNV1166USN01), filed contemporaneously. The related application is hereby incorporated by reference for all purposes.

This application is related to US Nonprovisional Patent Application titled "METHOD AND APPARATUS FOR DATA ACCESS IN A HETEROGENEOUS PROCESSING SYSTEM WITH MULTIPLE PROCESSORS USING MEMORY EXTENSION OPERATION" (SBNV1167USN01), filed contemporaneously. The related application is hereby incorporated by reference for all purposes.

CROSS-REFERENCES AND INCORPORATIONS

The following are incorporated by reference for all purposes:
- Prabhakar et al., "Plasticine: A Reconfigurable Architecture for Parallel Patterns," ISCA '17, Jun. 24-28, 2017, Toronto, ON, Canada; and
- Koeplinger et al., "Spatial: A Language and Compiler for Application Accelerators," *Proceedings of the 39th ACM SIGPLAN Conference on Programming Language Design and Embodiment* (PLDI), Proceedings of the 43rd International Symposium on Computer Architecture, 2018.

BACKGROUND

Technical Field

The present invention relates in general to data access in a heterogeneous system, and more particularly to method and apparatus for selecting data access method from among multiple different data access methods in a heterogeneous processing system with multiple processors.

Context

In a heterogeneous processing system which includes multiple processors (or processing units) of different types, application users may run one part of an application on a first processor, a second part of the application on a second processor, a third part of the application on a third processor, and so on. The different processor types may include, for example, a general processing unit (GPU), a reconfigurable dataflow unit (RDU), a host processor such as a central processing unit (CPU), etc. A GPU may be implemented in any suitable manner, such as, for example, an artificial intelligence processing unit (APU). Examples of APUs include a graphics processing unit (GrPU), a data processing unit (DPU), a streaming processing unit (SPU), a neural processing unit (NPU), a tensor processing unit (TPU), etc. Graphics processors are denoted herein as GrPUs to avoid confusion with general processing units GPUs, which may not be specific to particular functions. Each processor type may be configured to optimally execute different portions of an application. In addition, each processor may include accessible memory associated with that processor.

When different parts of an application are executed on different processors, output data from one processor may need to be provided as input data for another processor. Applications may be divided into batches and executed in pipelines. For example, input data may be transferred from CPU memory to GPU memory, in which the GPU runs a first part of the application using the input data and generating first output data. The first output data may be passed to the RDU memory in which the RDU runs a second part of the application generating second output data, which may then be transferred back to the host memory for evaluation or examination by the CPU. Each stage of the pipeline, including the computations on different processing units and the data passed between them, can overlap when working on different applications or different batches of data from the same application.

SUMMARY

A heterogeneous processing system as described herein includes a host processor coupled to a host memory, a first processor coupled to a first memory, a second processor coupled to a second memory, multiple data transfer resources, and switch and bus circuitry that communicatively couples the host processor, the first processor, the second processor, and the data transfer resources. The host processor is configured to detect an application for execution by both the first processor and the second processor, to select one of multiple different data access methods for accessing data between the first and second processors, and to configure the heterogeneous processing system based on the selected data access method.

The host processor may be configured to select the most efficient data access method based on current latency and bandwidth requirements. The host processor may be configured to select the most efficient data access method based on user-defined metadata of data passing, including source and destination device types, memory addresses, and bandwidth of application-defined pipeline and latency requirement of operation device stages.

The host processor may select memory extension operation by mapping virtual addresses of the second memory to physical addresses of the switch and bus circuitry and by configuring the first processor to directly access the second memory using the mapped physical addresses according to the memory extension operation. The second processor may be programmed to execute a first part of the application to generate and write first data into the second memory, and the first processor may be configured to directly access the first data from the second memory while executing a second part of the application using the first data. The first processor may further be configured to directly access the host memory and to write second data output from executing the second part of the application directly into the host memory. Alternatively, the first processor may be configured to execute a first part of the application to generate first data and to directly write the first data into the second memory. Or first processor may be configured to directly read first data from the host memory while executing the first part of the application using the first data to generate second data and to directly write the second data into the second memory while executing the first part of the application.

The host processor may be configured to map virtual addresses of the second memory to physical addresses of the switch and bus circuitry and to configure a first data transfer resource to perform a one memory to memory transfer operation between the first memory and the second memory. The host processor may be configured to program the first data transfer resource to directly transfer data between the first memory and the second memory using the mapped physical addresses. The second processor may be programmed to execute a first part of the application to generate and write first data into the second memory, where the host processor is configured to prompt the first data transfer resource to transfer the first data from the second memory to the first memory. The first processor may be configured to execute a second part of the application using the first data and write second data into the first memory, where the host processor is configured to prompt the first data transfer resource to transfer the second data into the host memory. Alternatively, the first processor may be configured to execute a first part of the application to generate and write first data into the first memory, where the host processor is configured to prompt the first data transfer resource to transfer the first data from the first memory to the second memory. The second processor may be programmed to execute a second part of the application using the first data and write second data into the second memory. The host processor may be configured to prompt the second data transfer resource to transfer the second data from the second memory into the host memory.

The host processor may select a two memory to memory transfer operation by allocating buffer space within the host memory, where the first processor is configured to execute a first part of the application which generates and writes first data into the first memory, and where the host processor is further configured to program the data transfer resources to transfer the first data from the first memory to the buffer space of the host memory and to transfer the first data from the buffer space of the host memory into the second memory. The buffer space may be a common buffer that is allocated within a non-swappable portion of the host memory. The second processor may be configured to execute a second part of the application and to write second data in the second memory, where the host processor is configured to prompt one of the data transfer resources to transfer the second data from the second memory to the host memory.

A method of selecting data access method in a heterogeneous system according to one implementation includes detecting an application for execution by both the first processor and the second processor, selecting one of different data access methods for accessing data between the first and second processors, and configuring the heterogeneous processing system according to the selected data access method.

The method may include selecting memory extension operation, which includes mapping, by the host processor, virtual addresses of the second memory to physical addresses of the switch and bus circuitry, and configuring, by the host processor, the first processor to directly access the second memory using the mapped physical addresses according to the memory extension operation.

The method may include selecting one memory to memory transfer operation, which includes mapping, by the host processor, virtual addresses of the second memory to physical addresses of the switch and bus circuitry, and configuring, by the host processor, the first data transfer resource to perform a one memory to memory transfer operation between the first memory and the second memory using mapped addresses.

The method may include selecting a two memory to memory transfer operation, which includes allocating buffer space in the host memory, programming a first data transfer resource with source addresses of the first memory and destination addresses of the buffer space, programming a second data transfer resource with source addresses of the buffer space and destination addresses of the second memory, executing a first part of an application by the first processor which generates and writes first data into the first memory, causing the first data transfer resource to transfer the first data from the first memory to the buffer space of the host memory, and causing the second data transfer resource to transfer the first data from the buffer space of the host memory to the second memory. The method may include the second processor executing a second part of the application using the first data and generating and writing second data into the second memory. The method may include allocating a common buffer within a non-swappable portion of the host memory. At least one of the data transfer resources may be a direct memory access (DMA) engine, where the method may include allocating the buffer space in host memory as DMA addressable memory.

BRIEF DESCRIPTION OF THE DRAWINGS

The technology is illustrated by way of example and is not limited by the accompanying figures, in which like references indicate similar elements. Elements in the figures are illustrated for simplicity and clarity and have not necessarily been drawn to scale.

Figure 1:
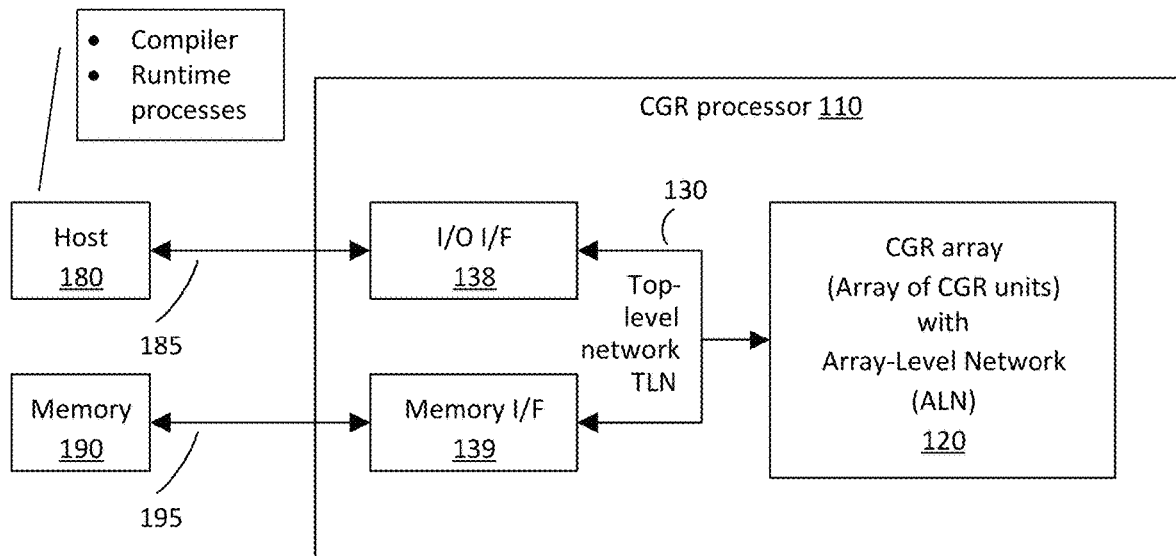
FIG. 1 illustrates an example system including an integrated circuit (IC), a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

A host runtime processing system as described herein can dynamically select the most efficient data passing method for a given set of source and target devices in an application defined pipeline (ADP) based on the latency & bandwidth requirement of the operating device stages. The host runtime processor hides the underlying details of methodologies of data passing from the application and picks between one of at least the three different methods, including two memory to memory transfers via a common buffer area of a CPU, one memory to memory transfer without using any buffer(s) on the CPU, and memory extension operation as further described herein. The first two data passing methods involve memory to memory transfer, whereas the memory extension operation involves direct memory access (for directly reading data or directly writing data) without any memory to memory transfer operations.

Such dynamic operation enables pre & post data passing stages of the ADP to read or write directly to or from addressable memory of an operating device as part of the compute-bound operations. Application users do not need to take care of selecting the data passing method or know details on how to program a particular data passing method. The host runtime processor uses the user-defined metadata of data passing, such as the source and destination device types, the memory addresses on both sides of the data-passing, ADP bandwidth and latency requirement of operating device stages, number of configured common or multiple buffers, etc., to determine optimal data passing method for the input or output, and to program the data passing or memory access method to orchestrate and complete data access between source and target devices.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GrPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

APU—artificial intelligence (AI) and AI processing unit.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to perform one or more operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph and is sometimes referred to as a reconfigurable dataflow unit (RDU).

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple coarsely reconfigurable data processors. In further implementations, CGR processor 110 may include one or more units of array of CGR units 120.

Host 180 may be, or include, a computer such as further described with reference to FIG. 2. Host 180 runs runtime processes, as further referenced herein, and may also be used to run computer programs, such as the compiler further described herein with reference to FIG. 12. In some implementations, the compiler may run on a computer that is similar to the computer described with reference to FIG. 2, but separate from host 180.

CGR processor 110 may accomplish computational tasks by executing a configuration file (for example, a PEF file). For the purposes of this description, a configuration file corresponds to a dataflow graph, or a translation of a dataflow graph, and may further include initialization data. A compiler compiles the high-level program to provide the configuration file. In some implementations described herein, a CGR array is configured by programming one or more configuration stores with all or parts of the configuration file. A single configuration store may be at the level of the CGR processor or the CGR array, or a CGR unit may include an individual configuration store. The configuration file may include configuration data for the CGR array and CGR units in the CGR array, and link the computation graph to the CGR array. Execution of the configuration file by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
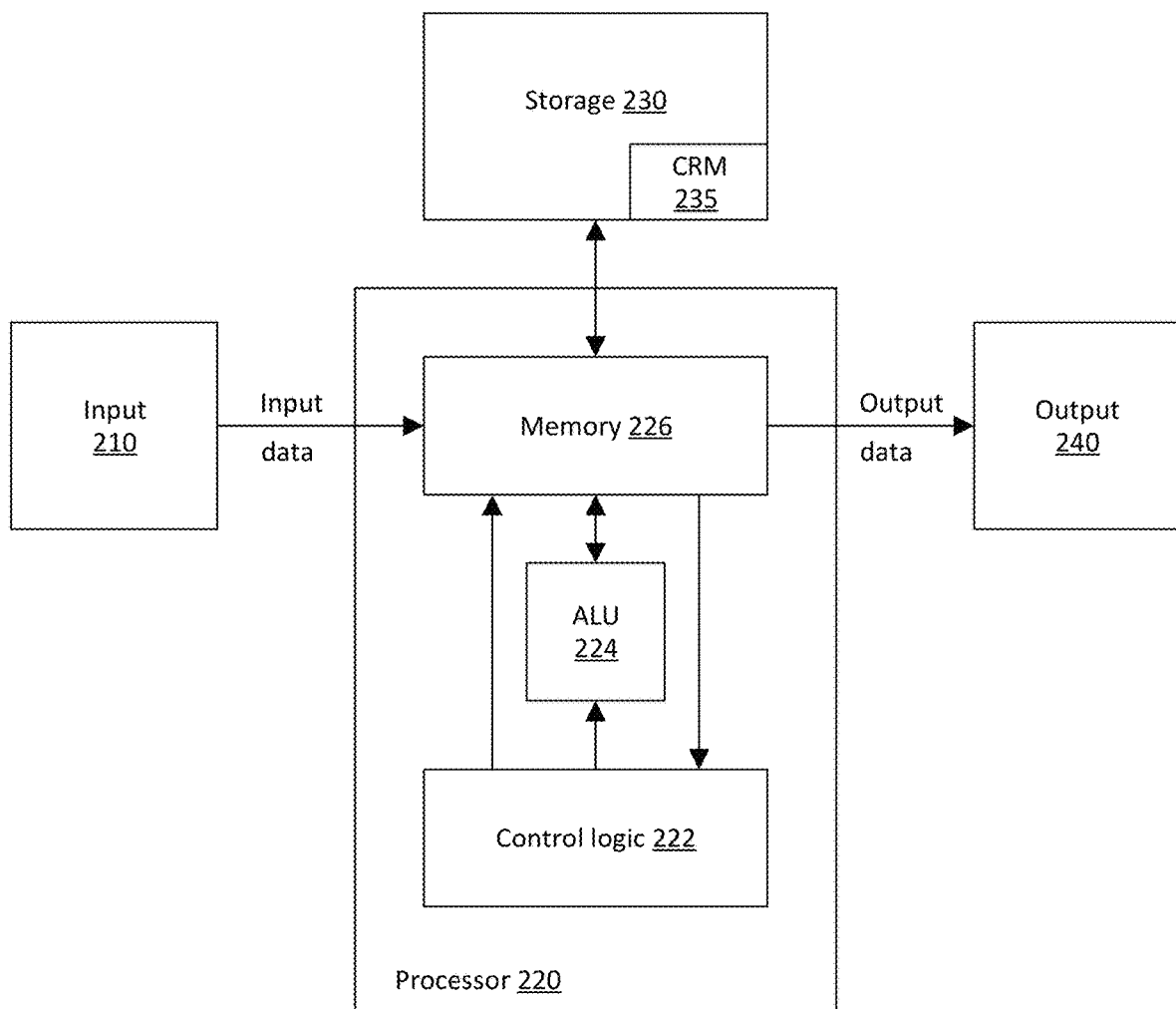
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
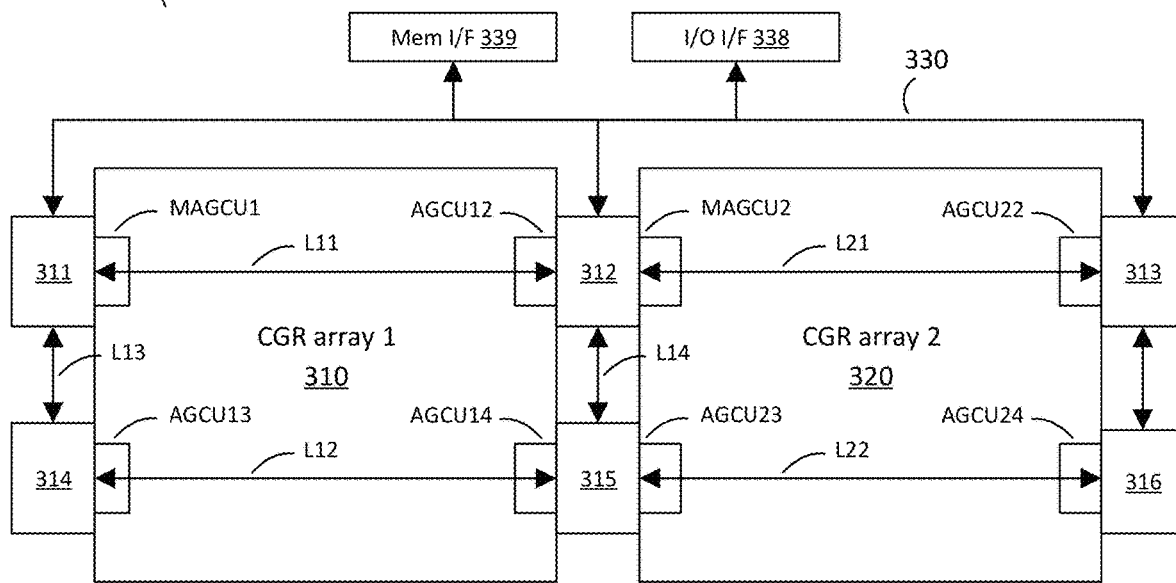
FIG. 3 illustrates example details of a coarse-grained reconfigurable architecture (CGRA) including a top-level network (TLN) and two reconfigurable dataflow units (RDUs).

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
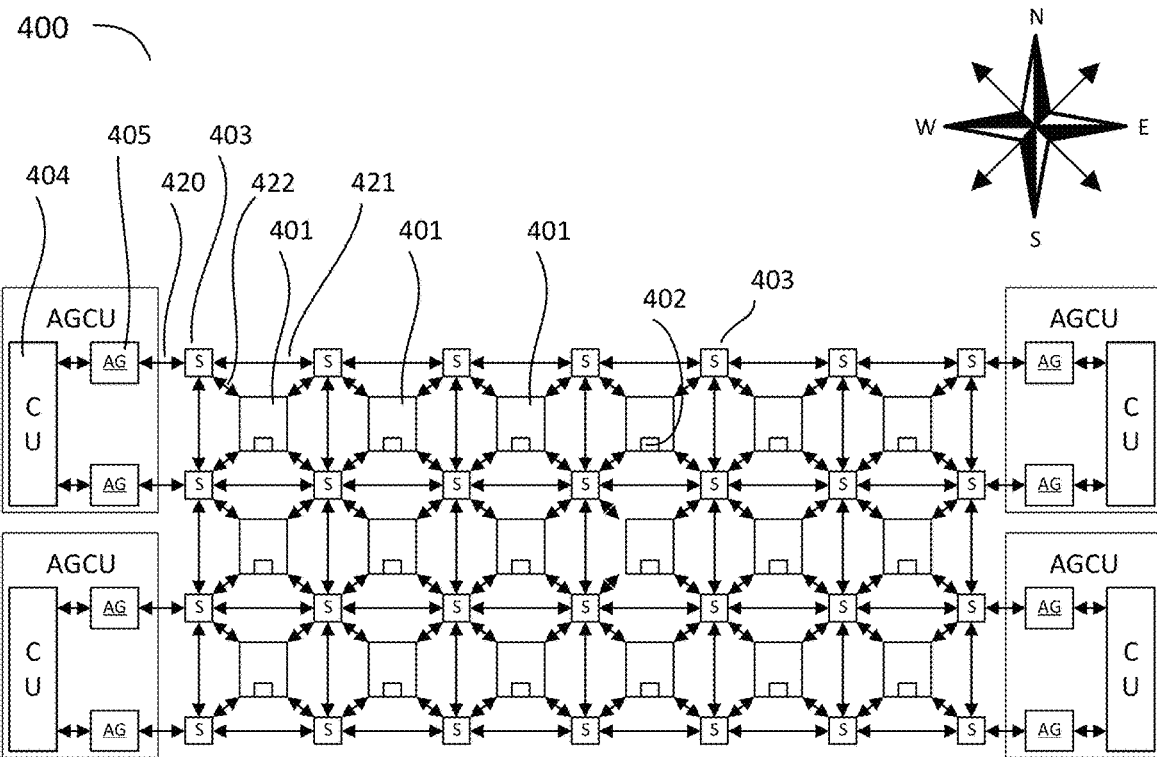
FIG. 4 illustrates an example RDU, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
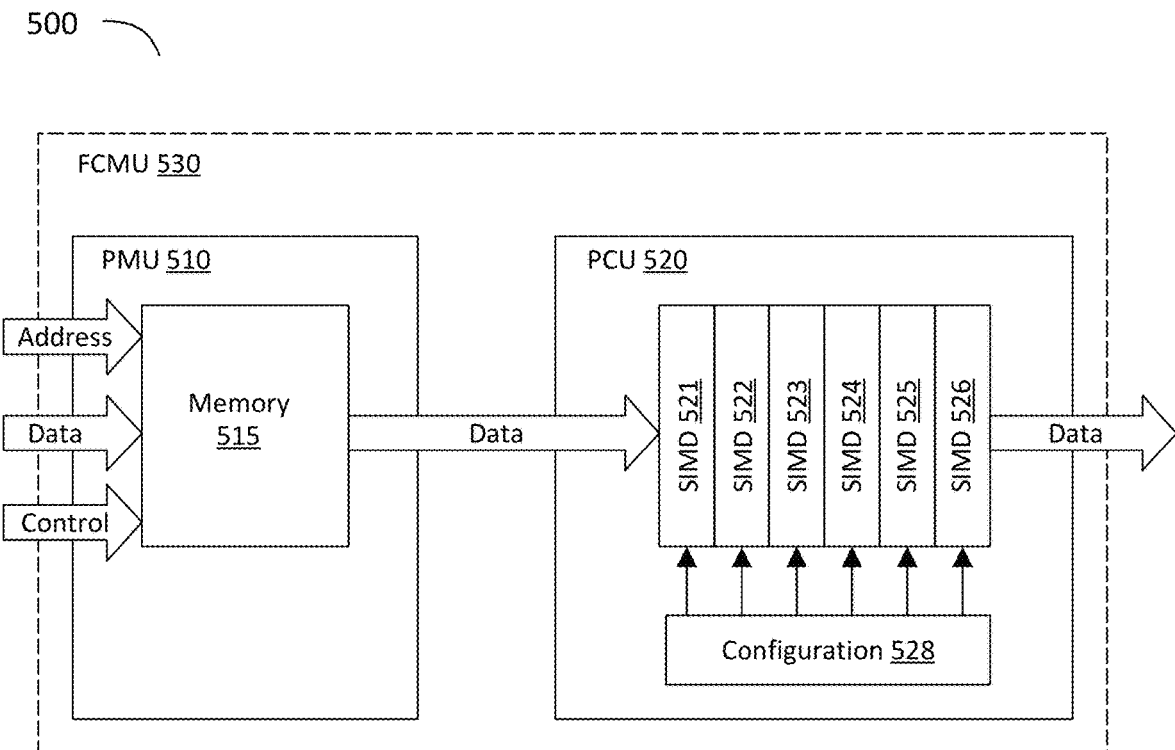
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
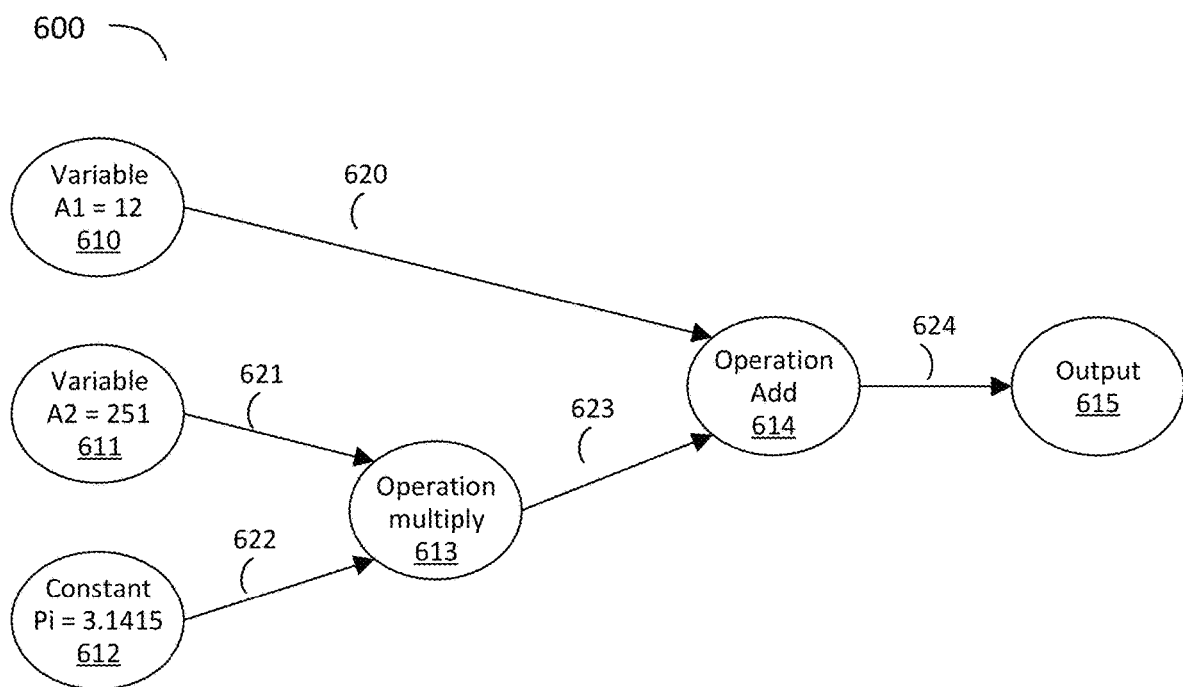
FIG. 6 shows an example of a computation graph.

FIG. 6 shows an example of a computation graph 600. Computation graphs represent mathematical expressions, and comprise nodes and directed edges. In FIG. 6, nodes are drawn as circles and directed edges are drawn as arrows. A node can represent a constant, a variable, for example from an input, an operation, an equation, or an output value. A directed edge can represent a dependency. Node 610 represents a variable A1, whose present value equals 12. Node 611 represents a variable A2, whose present value equals 251. Node 612 represents the constant π. Node 613 represents a multiplication operation. It receives its input data from node 611 via directed edge 621 and from node 612 via directed edge 622. Node 614 represents an addition operation. Node 614 receives its input data from node 610 via directed edge 620 and from node 613 via directed edge 623. Node 614 outputs its result in output node 615 via directed edge 624. Computation graph 600 as a whole represents the equation Output=A1+pi*A2.

The depicted computation graph 600 is very simple and could be implemented electronically in many ways. For example, it could be hardwired as a circuit of digital gates in an application-specific IC (ASIC), or an FPGA could be configured to emulate the circuit of digital gates, or a CGR processor could be configured to perform the addition and multiplication functions, or a CPU could run a conventional computer program to perform the functions. In all implementations, the timing is important. Node 614 is not able to calculate a valid output value until all its input values are valid. That means node 613 must be finished first. Most digital circuits are implemented as pipelines of clocked stages. If the add operation of node 614 is in a later stage than the multiplication operation of node 613, then a fixed-delay buffer may need to be inserted between node 610 and node 614 to synchronize the value of variable A1 with the result of the multiplication in node 613. The fixed-delay buffer can be added to the graph to make it physically implementable.

Most computation graphs are a-cyclic, i.e., they don't include loops. One class of computation graphs, dataflow graphs, may include loops, and even nested loops. This can make delays of operations performed by nodes variable, dependent on the data flowing through a pipeline of operations. When a high-level program includes multiple pipelines of parallel, interdependent operations, then synchronization can become highly complex. Synchronization can be further complicated when directed edges are implemented as data channels in a network, since the data channels can become congested. A CGR processor, may resolve both problems by using dataflow control information, sent as messages from consuming nodes to producing nodes to indicate that the consuming node is ready to receive the information, and a credit token system that prevents congestion of the data channels between the producing and consuming nodes.

Figure 7:
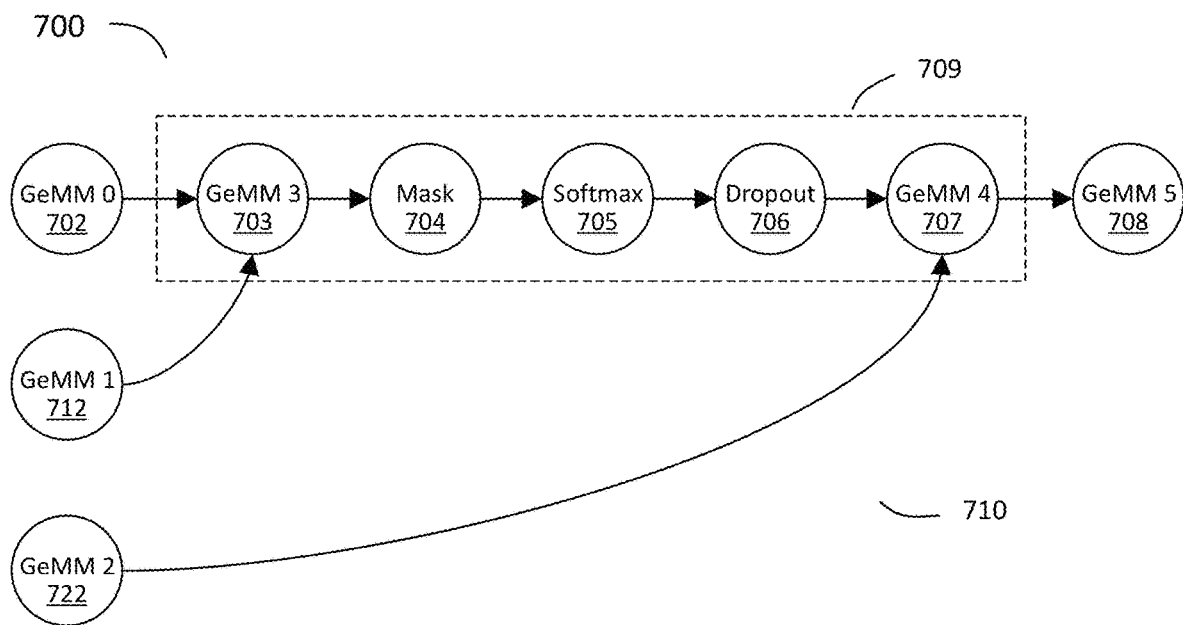
FIG. 7 shows an example of a dataflow graph.

FIG. 7 shows an example of a dataflow graph 700. This example, one head of a multi-head attention module in the Transformer model first published by Vaswani, et al., "Attention Is All You Need," 31 st Conference on Neural Information Processing Systems, 2017, is well known in the industry. It includes a loop 709 within a loop 710. Loop 710 includes four general matrix multiplications, GeMM 702, GeMM 712, GeMM 722, and GeMM 708. Loop 709 includes an ingress matrix multiplication GeMM 703, mask fill node 704, softmax node 705, dropout node 706, and egress matrix multiplication node 707.

To physically implement dataflow graph 700, an implementation may insert three types of stage buffers: (1) inter-stage buffers, (2) intra-stage buffers, and (3) interface buffers. The interface buffers are used because the granularity of communication (i.e., the size of tensors or data produced or consumed) varies between loops at different levels. Further, an implementation must add dataflow control information, to synchronize the various stages of asynchronous computation.

Figure 8:
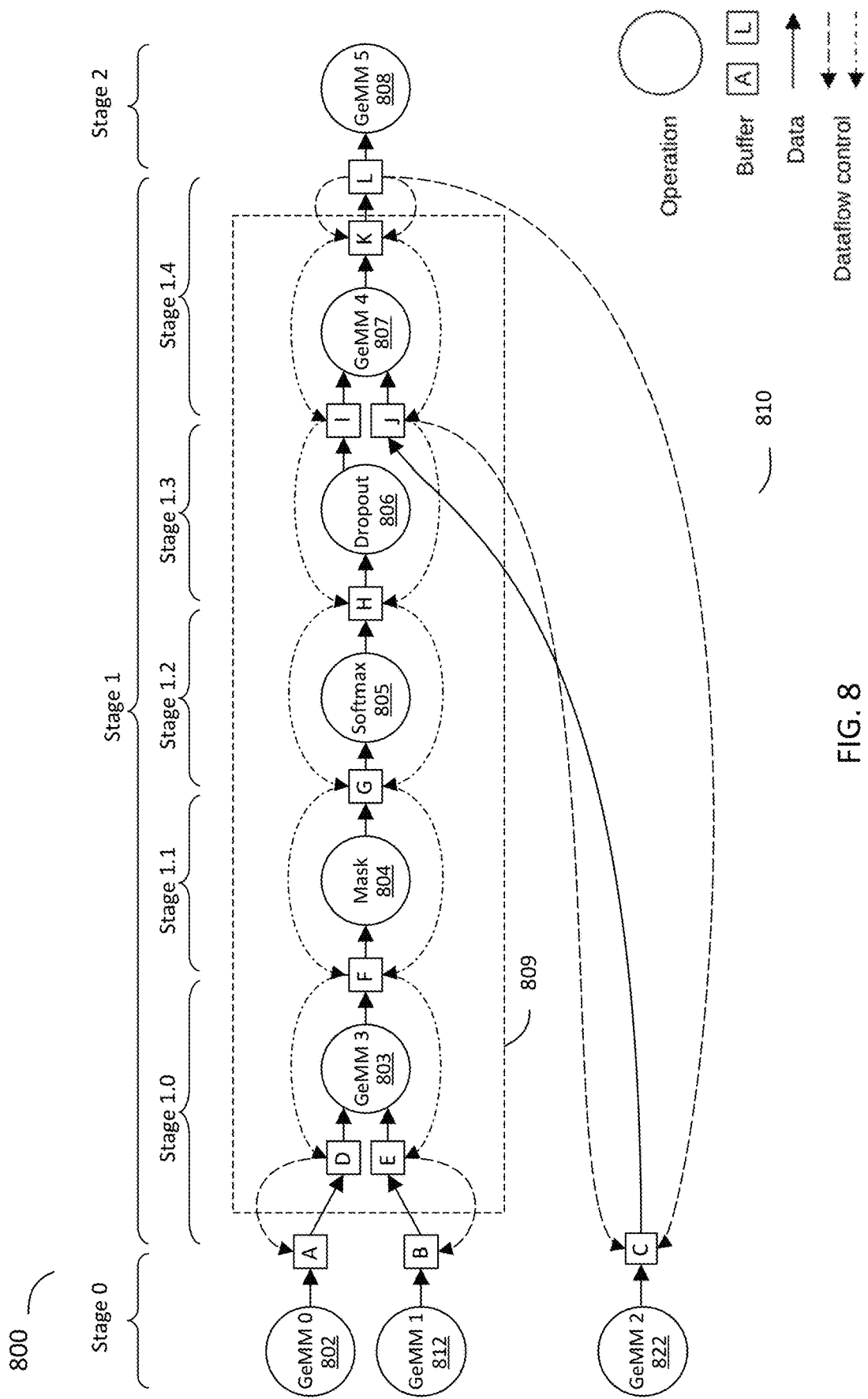
FIG. 8 shows the dataflow graph of FIG. 7 with buffers and dataflow control information added.

FIG. 8 shows the dataflow graph of FIG. 7 with buffers and dataflow control information added. A compiler in the technology presented herein can create graph 800 from dataflow graph 700, assign the nodes to compute units and memory units in a CGR array, and assign edges and dataflow control information to data channels in an array-level network that connects the compute units and memory units.

To get from dataflow graph 700 to graph 800, one compiler implementation divides the dataflow graph in stages (stages 0, 1, and 2 are shown in this example), and where there are nested loops also in substages (substages 1.0 through 1.4 are shown). The implementation inserts buffers between the stages to allow for pipelined processing in one or more parallel meta-pipelines that may interact. The buffers are shown as blocks labeled A . . . L. They are different from buffers at the gate level, which may be single or double inverters used to boost the energy level of digital signals that need to travel through long wires or that need to drive high-capacitance loads, or which may be flipflops operated by a system clock and used to implement synchronous logic. The buffers at the meta-pipeline level may be memories, register files, shift registers, or first-in-first-out (FIFO) memories of fixed or variable length, storing one or more data items (e.g., scalars, vectors, or tensors). They may be clocked by a producer node to store data or by a consumer node to release data. They may further be controlled by dataflow control information coming from, for example, downstream nodes. FIG. 8 shows the same operation nodes as FIG. 7 (with like numbering), but the edges (solid arrows), where data flows, are interrupted by the buffers to partition the graph into stages, and dataflow control information is added (shown as dashed arrows for loop 810 and dash-dot arrows for loop 809). In the example shown, data travels downstream (solid arrows from the left to the right) and dataflow control information travels upstream (dashed arrows from the right to the left).

In further preparation for a physical implementation of graph 800, an implementation may assign each operation node to one or more logical compute units or memory units, and each buffer to one or more logical memory units. Some implementations may perform further preparations and optimizations. All implementations proceed to place and route, i.e., assign the logical units to physical units in a layout of a coarsely reconfigurable array, and (in some implementations) assign the data connections and the dataflow control information connections to data channels in the ALN in the CGR array.

Figure 9:
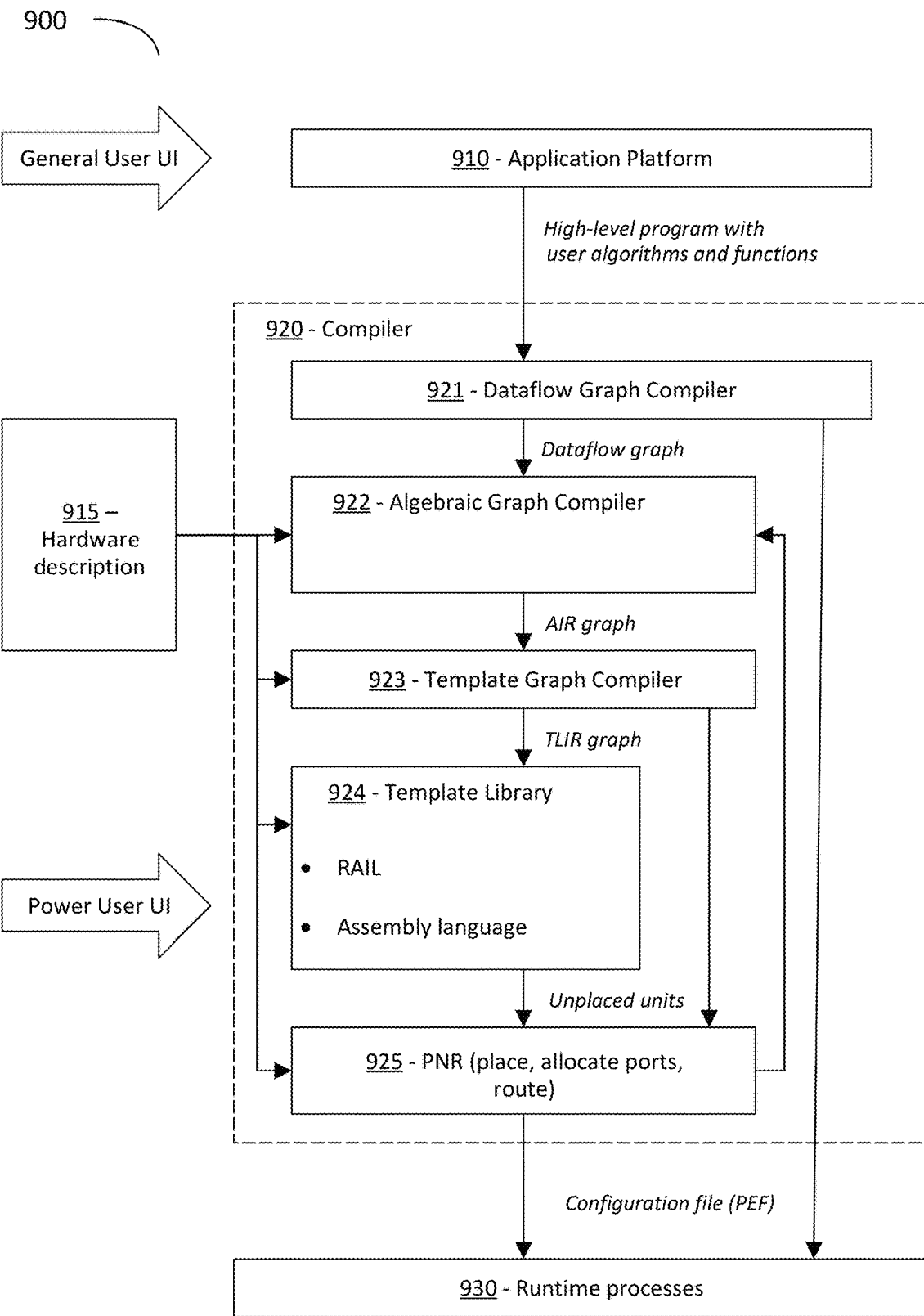
FIG. 9 is a block diagram of a compiler stack implementation suitable for generating a configuration file for a coarsely reconfigurable data processor or a CGRA processor.

FIG. 9 is a block diagram of a compiler stack 900 implementation suitable for generating a configuration file for a CGR processor. As depicted, compiler stack 900 includes several stages to convert a high-level program with user algorithms and functions, e.g., algebraic expressions and functions, to configuration data for the CGR units. Compiler stack 900 may take its input from application platform 910, or any other source of high-level program statements suitable for parallel processing, which provides a user interface for general users. It may further receive hardware description 915, for example defining the physical units in a reconfigurable data processor or CGRA processor. Application platform 910 may include libraries such as PyTorch, TensorFlow, ONNX, Caffe, and Keras to provide user-selected and configured algorithms. Application platform 910 outputs a high-level program to compiler 920, which in turn outputs a configuration file to the reconfigurable data processor or CGRA processor where it is executed in runtime processes 930. Compiler 920 may include dataflow graph compiler 921, which may handle a dataflow graph, algebraic graph compiler 922, template graph compiler 923, template library 924, and placer and router PNR 925. In some implementations, template library 924 includes RDU abstract intermediate language (RAIL) and/or assembly language interfaces for power users.

Dataflow graph compiler 921 converts the high-level program with user algorithms and functions from application platform 910 to one or more dataflow graphs. The high-level program may be suitable for parallel processing, and therefore parts of the nodes of the dataflow graphs may be intrinsically parallel unless an edge in the graph indicates a dependency. Dataflow graph compiler 921 may provide code optimization steps like false data dependency elimination, dead-code elimination, and constant folding. The dataflow graphs encode the data and control dependencies of the high-level program. Dataflow graph compiler 921 may support programming a reconfigurable data processor at higher or lower-level programming languages, for example from an application platform 910 to C++ and assembly language. In some implementations, dataflow graph compiler 921 allows programmers to provide code that runs directly on the reconfigurable data processor. In other implementations, dataflow graph compiler 921 provides one or more libraries that include predefined functions like linear algebra operations, element-wise tensor operations, non-linearities, and reductions required for creating, executing, and profiling the dataflow graphs on the reconfigurable processors. Dataflow graph compiler 921 may provide an application programming interface (API) to enhance functionality available via the application platform 910.

Algebraic graph compiler 922 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 922 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 922 may further include an arithmetic or algebraic intermediate representation (AIR) level that translates high-level graph and mapping decisions provided by the MAC level into explicit AIR graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 923 may translate AIR graphs into TLIR graphs, optimizing for the target hardware architecture and/or into unplaced units suitable for PNR 925. Template graph compiler 923 may add further information (name, inputs, input names and dataflow description) for PNR 925 and make the graph physically realizable through each performed step. Template graph compiler 923 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 924 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

PNR 925 translates and maps logical (i.e., unplaced physically realizable) CGR units to the physical chip level (e.g., a physical array of CGR units), determines physical data channels to allow for communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 925 may provide its functionality in multiple steps and may include multiple modules (not shown in FIG. 9) to provide the multiple steps, e.g., a placer, a router, a port allocator, and a PEF file generator. PNR 925 may receive its input data in various ways. For example, it may receive parts of its input data from any of the earlier modules (dataflow graph compiler 921, algebraic graph compiler 922, template graph compiler 923, and/or template library 924). In some implementations, an earlier module, such as template graph compiler 923, may have the task of preparing all information for PNR 925 and no other units provide PNR input data directly.

Further implementations of compiler 920 provide for an iterative process, for example by feeding information from PNR 925 back to an earlier module, so that the earlier module can execute a new compilation step in which it uses physically realized results rather than estimates of or placeholders for physically realizable circuits. For example, PNR 925 may feed information regarding the physically realized circuits back to algebraic graph compiler 922.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside an RDU. Other memory types for which the memory allocations can be made for various access patterns and layouts include cache, read-only look-up tables (LUTs), serial memories (e.g., FIFOs), and register files.

Compiler 920 binds memory allocations to unplaced memory units and binds operations specified by operation nodes in the dataflow graph to unplaced compute units, and these bindings may be specified in the configuration data. In some implementations, compiler 920 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 920 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing units (CPUs), CGR processor ICs, graphics processing units (GrPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

As previously described, different processor types may include a general processing unit (GPU), a reconfigurable dataflow unit (RDU), a host processor such as a central processing unit (CPU), etc. A GPU may be implemented in any suitable manner, such as, for example, an artificial intelligence processing unit (APU). Examples of APUs include a graphics processing unit (GrPU), a data processing unit (DPU), a streaming processing unit (SPU), a neural processing unit (NPU), a tensor processing unit (TPU), etc. Examples of APUs, which may be used to implement a GPU, include a graphics processing unit (GrPU), a data processing unit (DPU), a streaming processing unit (SPU), a neural processing unit (NPU), a tensor processing unit (TPU), etc. Each processor type may be configured to optimally execute different portions of an application. In addition, each processor may include accessible memory associated with that processor.

A host runtime processing system as described herein can dynamically select the most efficient data passing or access method for a given set of source and target devices (RDU, CPU and GPU) in an application defined pipeline (ADP) based on the latency & bandwidth requirement of the operating device stages. The host runtime processor hides the underlying details of methodologies of data passing from the application and picks between one of at least the three different methods, including two memory to memory transfer via a common buffer area of a CPU, one memory to memory transfer without using any buffer(s) on the CPU, and memory extension operation using direct memory access without data transfer as further described herein.

Figure 10:
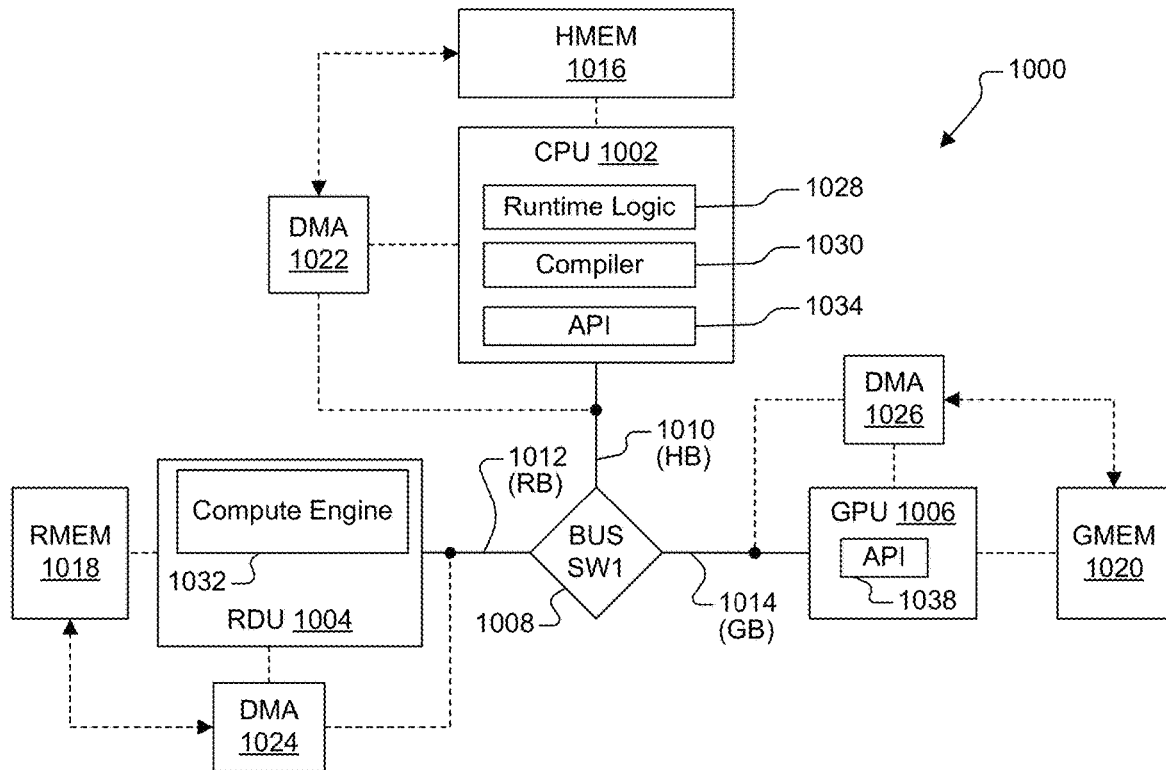
FIG. 10 is a simplified block diagram of a heterogeneous processing system according to one implementation.

FIG. 10 is a simplified block diagram of a heterogeneous processing system 1000 according to one implementation. The heterogeneous processing system 1000 includes multiple processors (or processing units) coupled together via a switch and bus interface as further described herein. The illustrated processors include a host central processing unit (CPU) 1002, a reconfigurable data flow unit (RDU) 1004, and a general processing unit (GPU) 1006, although alternative types of processors are contemplated. The RDU 1004 shown in the following description may be implemented according to that shown and described in FIGS. 1-9, whereas the CPU 1002 represents or otherwise may be used to implement the host 180 previously described. A bus switch (BUS SW1) 1008 uses local buses 1010, 1012, and 1014 to operatively couple the CPU 1002, the RDU 1004, and the GPU 1006 together. The bus 1010 is a local host bus (HB), the bus 1012 is a local RDU bus (RB), and the bus 1014 is a local GPU bus (GB) for the respective processors. Examples of local buses 1010, 1012, and 1014 include Peripheral Component Interconnect (PCI) or PCI Express (PCIe), Cache Coherent Interconnect for Accelerators (CCIX), Compute Express Link (CXI, and Open Coherent Accelerator Processor Interface (OpenCAPI), although alternative bus or interface configurations that currently exist or that are newly developed may also be used.

The CPU 1002, the RDU 1004, and the GPU 1006 each include a local memory, shown as a host memory (HMEM) 1016, an RDU memory (RMEM) 1018, and a GPU memory (GMEM) 1020, respectively. Each of the memories HMEM 1016, RMEM 1018, and GMEM 1020 may include storage resources for storing data and information including any combination of random-access memory (RAM), such as DRAM or SRAM or the like, read-only memory (ROM), latches, registers, and other types of memory devices. The heterogeneous processing system 1000 is shown as a logical configuration in which dashed lines are shown coupling the memories HMEM 1016, RMEM 1018, and GMEM 1020, to the CPU 1002, the RDU 1004, and the GPU 1006, respectively, for purposes of illustration. In an actual physical configuration, the memories may be incorporated within the respective processors, such as is the case for system-on-chip (SoC) configurations.

The CPU 1002, the RDU 1004, and the GPU 1006 may each be coupled to or otherwise incorporate a local data transfer resource, such as, for example, a direct memory access (DMA) engine, for transferring data between memory devices via the BUS SW1 1008. As shown, a DMA engine 1022 of the CPU 1002 enables data transfer between the HMEM 1016 and either the RMEM 1018 or the GMEM 1020, a DMA engine 1024 of the RDU 1004 enables data transfer between the RMEM 1018 and either the HMEM 1016 or the GMEM 1020, and a DMA engine 1026 of the GPU 1006 enables data transfer between the GMEM 1020 and either the HMEM 1016 or the RMEM 1018. Each of the DMA engines 1022, 1024, and 1026 are logically shown as external to the corresponding processors using dashed lines, but may actually be incorporated within the respective processors.

In addition, each of the DMA engines 1022, 1024, and 1026 may incorporate different DMA engine types or different DMA channels that may be separately programmed and selected by the CPU 1002 depending upon the data transfer needs at any given time. For example, the different DMA engine types or different DMA channels of each DMA engine may include various bandwidth levels or priority levels or the like as understood by those of ordinary skill in the art.

The CPU 1002 programs any one or more of the DMA engines 1022, 1024, and 1026 with source and destination addresses for performing desired memory to memory data transfers, and then prompts the programmed DMA engine to perform the data transfer. Generally, DMA operations may be performed by each DMA engine independently from the corresponding processor for optimal performance once the DMA engine is programmed and prompted to perform the data transfer.

In various implementations, the CPU 1002 is a general-purpose processor suitable for performing host functions including execution of software programs. The CPU 1002 is shown including runtime logic 1028 for executing the programs and generally controlling operation of the heterogeneous processing system 1000 including programming the DMA engines 1022, 1024, and 1026. The runtime logic 1028 may be configured to provide on-demand access to the RDU 1004 and the GPU 1006. In one implementation, the runtime logic 1028 may include components such as a runtime library, tools, and a daemon service in a user space and a kernel module or driver in a kernel space. The CPU 1002 is shown including a compiler 1030 which receives one or more software applications and which generates corresponding configuration files for the applications that are adapted to be executed by a compute engine 1032 on the RDU 1004. It is noted that the runtime logic 1028 and the compiler 1030 are conceptual illustrations implemented by the CPU 1002 while executing corresponding applications or software.

The GPU 1006 generally represents another processing unit type depending upon system needs in a given configuration, such as, for example, an artificial intelligence (AI) processing unit or any other generic processing type, although not limited to any particular processing type. Different types of AI processing units are contemplated, such as a graphics processing unit (GrPU), a streaming processing unit (SPU), a neural processing unit (NPU), a data processing unit (DPU), a tensor processing unit (TPU), etc.

The CPU 1002 and the GPU 1006 are each shown including an application programming interface (API), shown as API 1034 and API 1038, respectively. It is noted that the illustrated APIs are also conceptual implementations performed by the corresponding processing unit when executing corresponding applications or software or the like. The APIs 1034 and 1038 may be configured to enable data transfer of between the different processors. Each API may be configured, for example, to perform address mapping for translating local or virtual addresses of a local processor to corresponding physical addresses used for transferring data. In those implementations in which the local buses 1010, 1012 and 1014 are configured according to PCIe, the APIs may be used to map local virtual addresses to physical PCIe addresses. Although the RDU 1004 may also be configured with an API, the CPU 1002 via the compiler 1030 or the like may program the compute engine 1032 with appropriate addresses for accessing memories of other processors. Such addresses may be physical addresses used for accessing the HMEM 1016 and PCIe addresses or the like for accessing the GMEM 1020.

Figure 11:
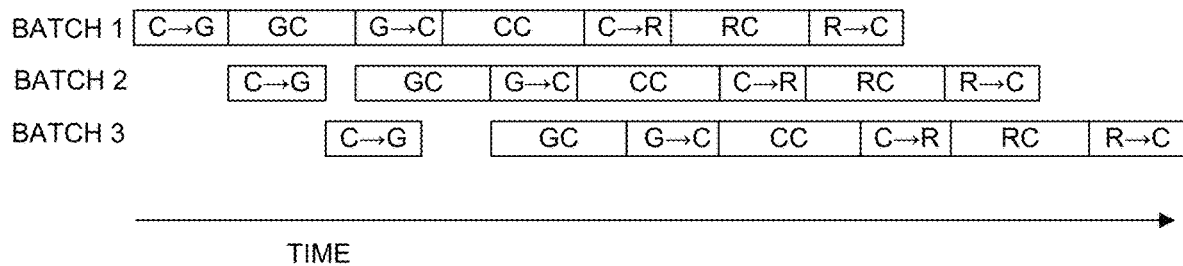
FIG. 11 is a simplified timing diagram depicting overlapping batch operations in time that may be performed by the heterogeneous processing system of FIG. 10.

FIG. 11 is a simplified timing diagram depicting overlapping batch operations in time that may be performed by the heterogeneous processing system 1000. Each stage of a pipeline, including the computations on different processing units and the data passed between them, can overlap when working on different applications or different batches of data from the same application. As shown, three batch operations BATCH 1, BATCH 2, and BATCH 3 are mapped versus time, in which the batch operations 1-3 may overlap each other in time as shown. A batch operation may include multiple iterations or runs of the same application executed on multiple processors of the heterogeneous processing system 1000.

The following notations are described for each of the batch operations 1-3. The notation "C→G" depicts a move of data from the memory HMEM 1016 of the CPU 1002 to the memory GMEM 1020 of the GPU 1006. The notation "GC" depicts computation or processing by the GPU 1006 on the data just moved into the GMEM 1020, which may generate output data stored back into the GMEM 1020. The notation "G→C" depicts a move of data, such as the output data just generated by the GPU 1006, from GMEM 1020 to HMEM 1016. The notation "CC" depicts computation or processing by the CPU 1002 on the data just moved into the HMEM 1016, which may generate output data stored back into the HMEM 1016. The notation "C→R" depicts a move of data, such as the output data just generated by the CPU 1002, from HMEM 1016 to the memory RMEM 1018 of the RDU 1004. The notation "RC" depicts computation or processing by the RDU 1004 on the data just moved into the RMEM 1018, which may generate output data stored back into the RMEM 1018. The notation "R→C" depicts a move of data, such as the output data just generated by the RDU 1004, from RMEM 1018 to HMEM 1016.

The first batch operation BATCH 1 is shown proceeding without delay between each of the data transfer steps and subsequent processing steps. The data transfer C→G of BATCH 2 is initiated after completion of the data transfer C→G of BATCH 1 and is completed during the processing step GC of BATCH 1. The processing step GC of BATCH 2 may begin after completion of the processing step GC of BATCH 1. From that point in time forward, BATCH 2 may proceed without further delay between each of the data transfer steps and subsequent processing steps. The data transfer C→G of BATCH 3 is initiated after completion of the data transfer C→G of BATCH 2 and is completed during the processing step GC of BATCH 2. The processing step GC of BATCH 3 may begin after completion of the processing step GC of BATCH 2. From that point in time forward, BATCH 2 may proceed without further delay between each of the data transfer steps and subsequent processing steps.

Figure 12:
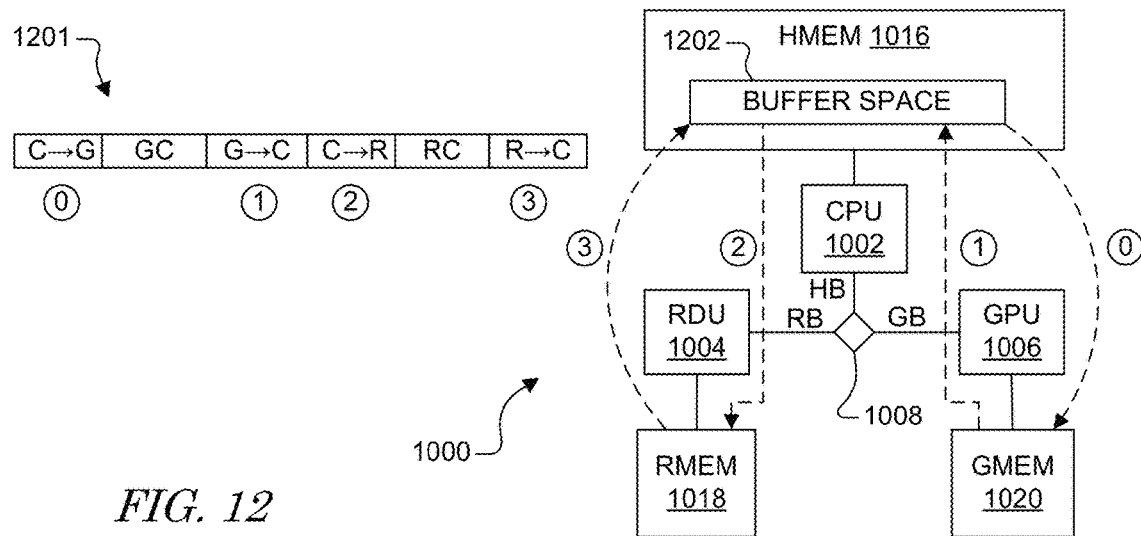
FIG. 12 depicts the heterogeneous processing system of FIG. 10 in simplified form performing a batch operation of a corresponding application using two memory to memory transfer operation according to one implementation.

FIG. 12 depicts the heterogeneous processing system 1000 in simplified form performing a batch operation 1201 of a corresponding application using two memory to memory transfer operation according to one implementation. Dashed-line arrows indicate data flow and circled numeric designations illustrate memory to memory data transfers during operation of the batch operation 1201. In this case, the arrows and the circled numeric designations coincide with each other. The batch operation 1201 is similar to each of the batch operations BATCH 1-3 of FIG. 11 except without the intermediate processing step CC by the CPU 1002. Instead, the HMEM 1016 of the host system is used for transferring data between the other memories GMEM 1020 and RMEM 1018. Preliminarily, the CPU 1002 may allocate buffer space 1202 in the HMEM 1016, which may include either a single buffer or multiple buffers in different configurations or under different conditions. Such buffer allocation may be according to a preliminary operation or function before execution of the batch operation 1201, or may be a dynamic operation in anticipation of or during operation of the batch operation 1201.

In one configuration, the buffer space 1202 can be implemented as a DMA addressable single or common buffer that can be used to minimize data movement cost between the GMEM 1020 of the GPU 1006 or the RMEM 1018 of the RDU 1004 to the HMEM 1016 and vice-versa. A "common" buffer means that there are no intermediate buffer to buffer transfers performed within the HMEM 1016 during memory to memory transfers between the RMEM 1018 and the GMEM 1020. In one configuration, the buffer space 1202 may be configured as a pinned memory buffer or the like meaning that it is not swappable or is not located within a swappable page of memory so that physical addresses are not changed during operation. Thus, the buffer space 1202 may be a single buffer located within a non-pageable or non-swappable portion of the HMEM 1016. It is noted that the GPU 1006 and the RDU 1004 can access a single buffer in the HMEM 1016 by virtue of it being a common buffer.

Alternatively, the buffer space 1202 may be configured as multiple buffers. For example, the buffer space 1202 may include two buffers bufferA and bufferB (not shown) addressable to the CPU 1002. The first buffer bufferA may be used to move the data from the GMEM 1020 memory to the HMEM 1016, an additional memory copy may be performed to copy bufferA to bufferB, and the data in bufferB is moved to the RMEM 1018. The opposite direction is also contemplated for moving data from the RMEM 1018 to the GMEM 1020 via the buffer space 1202 configured as the two buffers bufferA and bufferB. It is noted that multiple buffers may be used for overlapping batch operations. The CC operation shown in FIG. 11 may be an example of such conversion functions.

A preliminary data transfer "0" is shown moving initial data from the buffer space 1202 of the HMEM 1016 to the GMEM 1020 depicted in the batch operation 1201 as C→G. The GPU 1006 executes a first part of the application, labeled "GC" in the batch operation 1201, while writing output data back into the GMEM 1020. The CPU 1002 then prompts the DMA engine 1026 to perform a first memory to memory data transfer "1" of the output data from the GMEM 1020 to the buffer space 1202 in the HMEM 1016, depicted in the batch operation 1201 as G→C.

The data that was transferred to the buffer space 1202 is intended to be used as input data for the next part of the application to be executed on the RDU 1004. In one embodiment, the DMA engine 1024 (or the DMA engine 1022) may be used to perform a second memory to memory data transfer "2" to transfer the data from the buffer space 1202 to the RMEM 1018, which is depicted in the batch operation 1201 as C→R. It is noted that when the buffer space 1202 is configured as a common buffer as previously described, there is no need for buffer to buffer transfer between the memory data transfers "1" and "2". Thus, the data that was transferred into the buffer space 1202 from the GMEM 1020 for the memory data transfer "1" remains unmoved until it is transferred to the RMEM 1018 for the memory transfer "2". Alternatively, when the buffer space 1202 is configured as multiple buffers, there may be an intermediate transfer between two buffers within the buffer space 1202. The RDU 1004 executes a second part of the application using the transferred data, labeled "RC" in the batch operation 1201, while writing output data back into the RMEM 1018. A final data transfer "3" may be performed, depicted in the batch operation 1201 as R→C, to transfer the output data stored in the RMEM 1018 back to the buffer space 1202 of the HMEM 1016 for evaluation or examination by the CPU 1002.

FIG. 12 illustrates a serial data transfer operation in which the buffer space 1202 is used for each of the data transfers to and from the HMEM 1016 between the GMEM 1020 and the RMEM 1018. In this manner, the DMA engine 1026 of the GPU 1006 may be programmed with addresses of the buffer space 1202 and the GMEM 1020 for performing both the preliminary data transfer "0" and the first data transfer "1", and the DMA engine 1024 of the RDU 1004 may be programmed with addresses of the buffer space 1202 and the RMEM 1018 for performing both the second data transfer "2" and the final data transfer "3". DMA programming by the CPU 1002 may be performed preliminarily, such as during initialization or other time before execution of an application or batch operations or the like, or may be dynamic, such as when prompted during operation of the application or batch operation.

When the data transfers are part of a pipelined data transfer operation, then additional buffers in the HMEM 1016 may be defined and used for the first and last data transfers, and the DMA engines 1024 and 1026 may be dynamically programmed and reprogrammed during operation. For example, the DMA engine 1026 may be dynamically programmed with addresses between a first additional buffer (not shown) within the HMEM 1016 for transferring initial data from the HMEM 1016 to the GMEM 1020 for the preliminary data transfer "0", and then be dynamically reprogrammed with addresses of the buffer space 1202 for transferring data from the GMEM 1020 to the buffer space 1202 for the data transfer "1". Meanwhile, the CPU 1002 may fill the first additional buffer with more data for continued pipelined operation, and then the DMA engine 1026 is dynamically programmed again for the next data transfer. Ideally, this is not limited to the first and last data transfers. For example, if buffer space 1202 is configured with multiple buffers (e.g., buffers A and B), then data transfer "1" between GMEM 1020 and HMEM 1016 on buffer A can be overlapped with data transfer "2" between HMEM 1016 on buffer B to RMEM 1018.

Similarly, the DMA engine 1024 may be dynamically programmed with addresses between the buffer space 1202 and the RMEM 1018 for the data transfer "2", and then be dynamically reprogrammed with addresses of a second additional buffer (not shown) within the HMEM 1016 for transferring final data from the RMEM 1018 to the second additional buffer for the last data transfer "3". Then the DMA engine 1024 is dynamically programmed again with addresses of the buffer space 1202 for the next data transfer. The CPU 1002 retrieves data from the second additional buffer for evaluation before being filled again by the DMA engine 1024. Even so, only the buffer space 1202 is used for data transfer between the GMEM 1020 and the RMEM 1018.

The DMA engines 1024 and 1026 may each have multiple DMA channels in which additional DMA channels may be employed to streamline the pipelined data transfer operation. For example, a first DMA channel of each of the DMA engines 1024 and 1026 may be programmed once for performing the preliminary data transfer "0" and the last data transfer "3", respectively, while additional DMA channels may be programmed to transfer data between the first and second additional buffers. In this case, a first DMA channel of the DMA engine 1026 is programmed either preliminarily or dynamically during operation to transfer data from the GMEM 1020 to the buffer space 1202, and a first DMA channel of the DMA engine 1024 is programmed either preliminarily or dynamically during operation to transfer data from the buffer space 1202 to the RMEM 1018. During data transfer operation, additional DMA channels are programmed to transfer data from the first additional buffer to the GMEM 1020 (data transfer "0"), and after processing by the GPU 1006, to transfer data from the GMEM 1020 to the buffer space 1202 (data transfer 1). The DMA transfer engine 1024 then transfers data from the buffer space 1202 to the RMEM 1018 (data transfer "2"), and after processing by the RDU 1004, the DMA engine 1022, after having been reprogrammed, transfers data from the RMEM 1018 to the second additional buffer (data transfer 3). Operation repeats in this manner as long as necessary.

Figure 13:
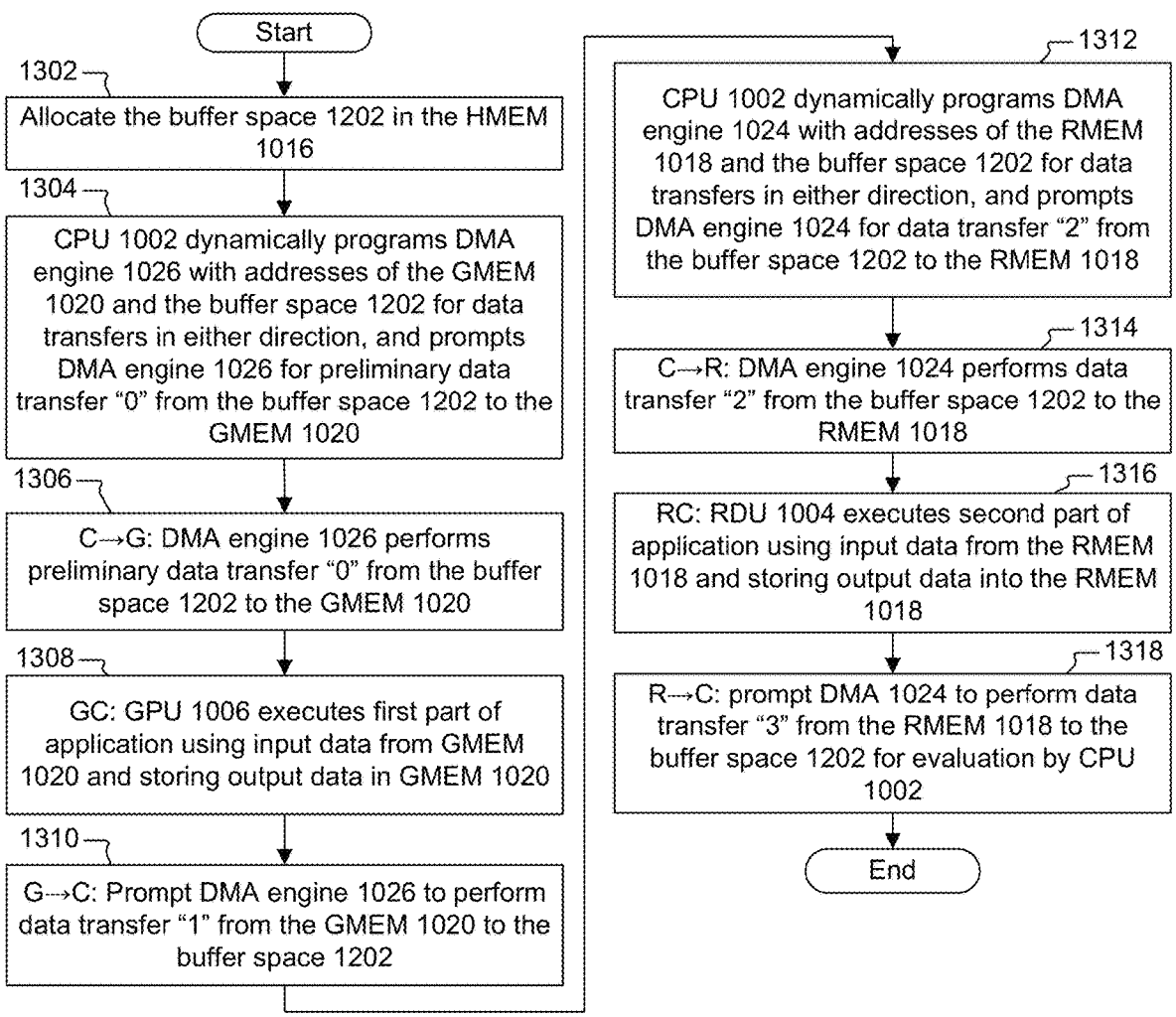
FIG. 13 is a flowchart diagram illustrating operation of the batch operation of FIG. 12.

FIG. 13 is a flowchart diagram illustrating operation of the heterogeneous processing system 1000 performing the batch operation 1201 using two memory to memory transfer according to one implementation. Operation may begin with the CPU 1002 allocating the buffer space 1202 in the HMEM 1016 (1302). As previously described, the buffer space 1202 may include a common buffer or multiple buffers, and such buffer allocation may be preliminary or dynamic.

A preliminary data transfer may be performed from the HMEM 1016 to the GMEM 1020 for providing initial input data for the GPU 1006, such as from the buffer space 1202 to the GMEM 1020, denoted C→G in the batch operation 1201. This initial data transfer may be performed by the DMA engine of the CPU 1002 or the GPU 1006. For the configuration illustrated, the CPU 1002 dynamically programs the DMA engine 1026 with addresses of the GMEM 1020 and the buffer space 1202 for performing data transfers in either direction, and then prompts the DMA engine 1026 (1304) to perform the preliminary data transfer "0". In addition, the DMA engine 1026 may be instructed to use addresses of the buffer space 1202 as source addresses and addresses of the GMEM 1020 as destination addresses for the immediate operation. The DMA engine 1026 is then prompted to perform the preliminary data transfer "0" C→G of the batch operation 1201 for providing initial input data for the GPU 1006 (1306).

The GPU 1006 then executes the first part of the application, denoted GC in the batch operation 1201, using input data in the GMEM 1020 and writing output data in the GMEM 1020 (1308). The CPU 1002 may then prompt the DMA engine 1026 to perform the first memory to memory data transfer "1" from the GMEM 1020 to the buffer space 1202, denoted G→C in the batch operation 1201 (1310). Since the DMA engine 1026 is already programmed for data transfers in either direction, it is instructed to use addresses of the GMEM 1020 as source addresses and addresses of the buffer space 1202 as destination addresses, and then to perform the data transfer G→C in the batch operation 1201.

In order to perform the memory to memory data transfer "2" to transfer output data from the buffer space 1202 to the RMEM 1018 as input data for the RDU 1004, denoted C→R in the batch operation 1201, the CPU 1002 dynamically programs the DMA engine 1024 with addresses of the RMEM 1018 and the buffer space 1202 for performing data transfers in either direction, and then prompts the DMA engine 1024 (1312). In addition, the DMA engine 1024 may be instructed to use addresses of the buffer space 1202 as source addresses and addresses of the RMEM 1018 as destination addresses. The DMA engine 1024 then performs the data transfer "2" denoted C→R in the batch operation 1201 (1314).

The RDU 1004 then executes the second part of the application, denoted RC in the batch operation 1201, using the input data transferred from the GMEM 1020 via the buffer space 1202 and stored in the RMEM 1018, and writing output data back into the RMEM 1018 (1316). Finally, if desired, the DMA engine 1024 is prompted to transfer the output data generated by the RDU 1004 and stored in the RMEM 1018 to the buffer space 1202 in the HMEM 1016 for evaluation or examination by the CPU 1002, which is data transfer "3" denoted R→C in the batch operation 1201 (1318), and operation is completed. Since already programmed, the DMA engine 1024 is instructed to use addresses of the RMEM 1018 as source addresses and addresses of the buffer space 1202 as destination addresses.

The buffer space 1202 in the HMEM 1016 may be implemented as DMA addressable memory that minimizes data movement cost when transferring data from the GMEM 1020 to the RMEM 1018. Additional buffers may be used in the HMEM 1016 for pipelined data transfer operations as previously described, these additional buffers are used for input and output data for the CPU 1002 and not for memory to memory data transfer between the GMEM 1020 and the RMEM 1018.

Figure 14:
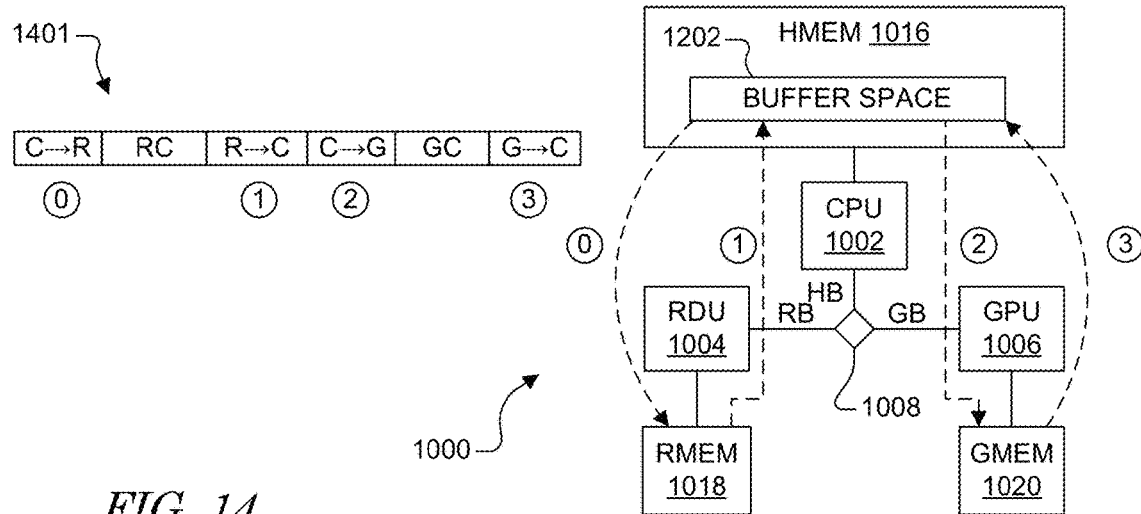
FIG. 14 depicts the heterogeneous processing system of FIG. 10 in simplified form performing a batch operation of a corresponding application using two memory to memory transfer operation according to one implementation.

FIG. 14 depicts the heterogeneous processing system 1000 in simplified form performing a batch operation 1401 of a corresponding application using two memory to memory transfer operation according to one implementation. The batch operation 1401 is substantially similar to the batch operation 1201 except that data flows in the opposite direction. Again, dashed-line arrows indicate data flow and circled numeric designations illustrate memory to memory data transfers during operation of the batch operation 1401, and again, the arrows and the circled numeric designations coincide with each other in this case. Again, the CPU 1002 may allocate the buffer space 1202 in the HMEM 1016 as a single buffer or as multiple buffers.

A preliminary data transfer "0" is shown moving initial data from the buffer space 1202 to the RMEM 1018 depicted in the batch operation 1401 as C→R. The RDU 1004 executes a first part of the application, labeled "RC" in the batch operation 1401, while writing output data back in the RMEM 1018. The CPU 1002 then prompts the DMA engine 1024 to perform a first memory to memory data transfer "1" of the output data from the RMEM 1018 to the buffer space 1202 in the HMEM 1016, depicted in batch operation 1301 as R→C.

The data that was transferred to buffer space 1202 is intended to be used as input data for the next part of the application to be executed on the GPU 1006. In this case, the DMA engine 1026 is used to perform a second memory to memory data transfer "2" to retrieve the data from the buffer space 1202 to the GMEM 1020, which is depicted in batch operation 1401 as C→G. Again, it is noted that when the buffer space 1202 is configured as a common buffer as previously described, there is no need for buffer to buffer transfer between the memory data transfers "1" and "2". Thus, the data that was transferred into the buffer space 1202 from the RMEM 1018 for the memory data transfer "1" remains unmoved until it is transferred to the GMEM 1020 for the memory transfer "2". Alternatively, when the buffer space 1202 is configured as multiple buffers, there may be an intermediate transfer between two buffers within the buffer space 1202. The GPU 1006 executes a second part of the application using the transferred data, labeled "GC" in the batch operation 1401, while writing output data back into the GMEM 1020. A final data transfer "3" may be performed, depicted in batch operation 1401 as G→C, to transfer the output data stored in the GMEM 1020 back to the HMEM 1016 for evaluation or examination by the CPU 1002.

FIG. 14 illustrates a serial data transfer operation in which the buffer space 1202 is used for each of the data transfers to and from the HMEM 1016 between the RMEM 1018 and the GMEM 1020. In this manner, the DMA engine 1024 of the RDU 1004 may be programmed with addresses of the buffer space 1202 and the RMEM 1018 for performing both the preliminary data transfer "0" and the first data transfer "1", and the DMA engine 1026 of the GPU 1006 may be programmed with addresses of the buffer space 1202 and the GMEM 1020 for performing both the second data transfer "2" and the final data transfer "3". Again, DMA programming may be performed preliminarily, such as during initialization or other time before execution of an application or batch operations or the like, or may be dynamic, such as when prompted during operation of the application or batch operation.

When the data transfers are part of a pipelined data transfer operation, then separate buffers in the HMEM 1016 may be defined and used for the first and last data transfers, and the DMA engines 1024 and 1026 may be dynamically programmed and reprogrammed during operation in a similar manner as previously described for the batch operation 1201. In the alternative, the DMA engine 1022 may be employed to streamline the pipelined data transfer operation, in which both of the DMA engines 1024 and 1026 are programmed only once while the DMA engine 1022 is dynamically programmed during operation between the first and second additional buffers for performing the preliminary data transfer "0" and the last data transfer "3" in a similar manner as previously described for the batch operation 1201.

Figure 15:
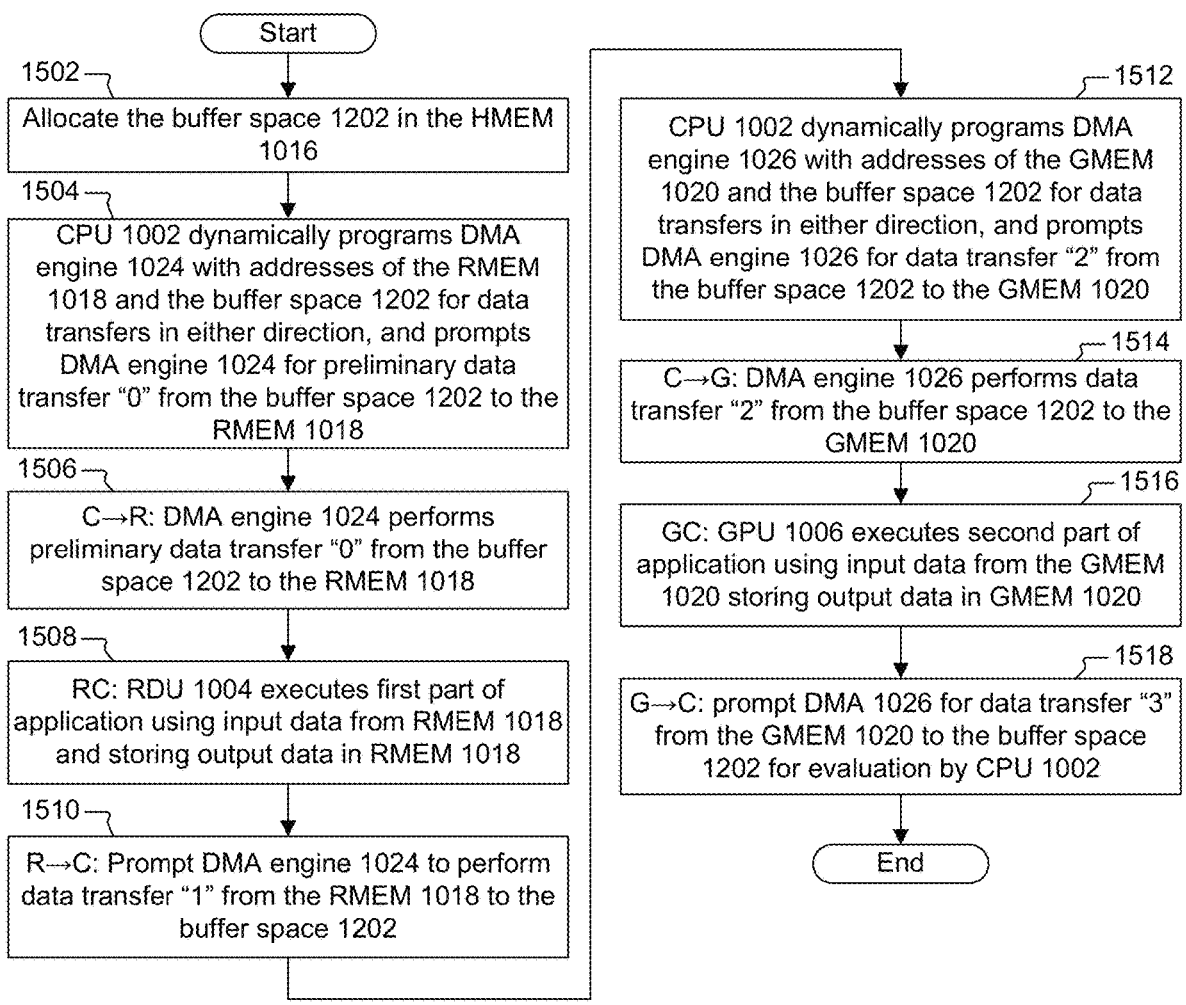
FIG. 15 is a flowchart diagram illustrating operation of the batch operation of FIG. 14.

FIG. 15 is a flowchart diagram illustrating operation of the heterogeneous processing system 1000 performing the batch operation 1401 using two memory to memory transfer operation according to one implementation. Initial operations are substantially similar as described for the batch operation 1201. Operation may begin with the CPU 1002 allocating the buffer space 1202 in the HMEM 1016 (1502). As previously described, the buffer space 1202 may include a common buffer or multiple buffers, and such buffer allocation may be preliminary or dynamic.

A preliminary data transfer may be performed from the HMEM 1016 to the RMEM 1018 for providing initial input data for the RDU 1004, such as from the buffer space 1202 to the RMEM 1018, denoted C→R in the batch operation 1401. This initial data transfer may be performed by the DMA engine of the CPU 1002 or of the RDU 1004. For the configuration illustrated, the CPU 1002 dynamically programs the DMA engine 1024 with addresses of the RMEM 1018 and the buffer space 1202 for performing data transfers in either direction, and then prompts the DMA engine 1024 (1504) to perform the preliminary data transfer "0". In addition, the DMA engine 1026 may be instructed to use addresses of the buffer space 1202 as source addresses and addresses of the GMEM 1020 as destination addresses for the immediate operation. The DMA engine 1024 is then prompted to perform the preliminary data transfer "0" C→R in the batch operation 1401 for providing initial input data for the RDU 1004 (1506).

The RDU 1004 then executes the first part of the application, denoted RC in the batch operation 1401, using input data from the RMEM 1018 and writing output data in the RMEM 1018 (1508). The CPU 1002 may then prompt the DMA engine 1024 to perform the first memory to memory data transfer "1" of the output data just generated and stored in the RMEM 1018 to the buffer space 1202, denoted R→C in the batch operation 1401 (1510). Since the DMA engine 1024 is already programmed for data transfers in either direction, it is instructed to use addresses of the RMEM 1018 as source addresses and addresses of the buffer space 1202 as destination addresses, and then to perform the data transfer R→C in the batch operation 1401.

In order to perform the memory to memory data transfer "2" to transfer output data from the buffer space 1202 to the GMEM 1020 as input data for the GPU 1006, denoted C→G in the batch operation 1401, the CPU 1002 dynamically programs the DMA engine 1026 with addresses of the GMEM 1020 and the buffer space 1202 for performing data transfers in either direction, and then prompts the DMA engine 1026 (1512). In addition, the DMA engine 1026 may be instructed to use addresses of the buffer space 1202 as source addresses and addresses of the GMEM 1020 as destination addresses. The DMA engine 1026 then performs the data transfer "2" denoted C→G in the batch operation 1401 (1514).

The GPU 1006 then executes the second part of the application, denoted GC in the batch operation 1401, using the input data transferred from the GMEM 1020 via the buffer space 1202 and stored in the GMEM 1020, and writing output data back into the GMEM 1020 (1516). Finally, if desired, the DMA engine 1026 is prompted to transfer the output data generated by the GPU 1006 and stored in the GMEM 1020 to the buffer space 1202 in the HMEM 1016 for evaluation or examination by the CPU 1002 (1518), which is data transfer "3" denoted G→C in the batch operation 1401, and operation is completed. Since already programmed, the DMA engine 1026 is instructed to use addresses of the GMEM 1020 as source addresses and addresses of the buffer space 1202 as destination addresses.

As with the batch operation 1201, the buffer space 1202 in the HMEM 1016 reduces the number of memory to memory data for the batch operation 1401 when transferring data from the RMEM 1018 to the GMEM 1020. Although additional buffers may be used in the HMEM 1016 for pipelined data transfer operations as previously described, these additional buffers are used for input and output data for the CPU 1002 and not for memory to memory data transfer between the GMEM 1020 and the RMEM 1018.

Figure 16:
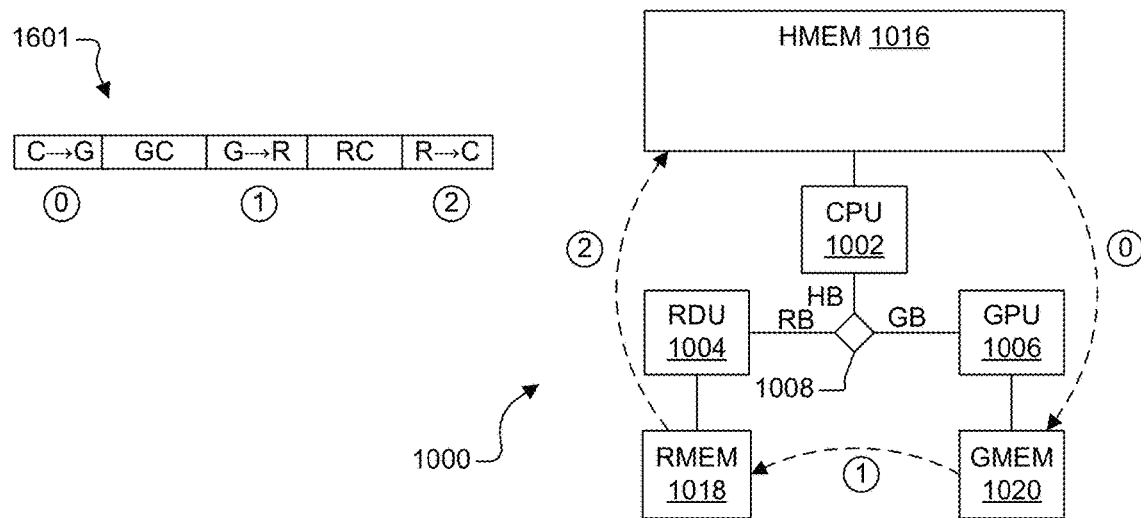
FIG. 16 depicts the heterogeneous processing system of FIG. 10 in simplified form performing a batch operation of a corresponding application using one memory to memory transfer operation according to one implementation.

FIG. 16 depicts the heterogeneous processing system 1000 in simplified form performing a batch operation 1601 of a corresponding application using one memory to memory transfer operation according to one implementation. Again, dashed-line arrows indicate data flow and circled numeric designations illustrate memory to memory data transfers during operation of the batch operation 1601. Also, the arrows and circled numeric designations coincide.

The CPU 1002 or the GPU 1006 may perform a preliminary data transfer "0" moving initial data from the HMEM 1016 to the GMEM 1020 depicted in the batch operation 1601 as C→G. The GPU 1006 executes a first part of the application depicted as "GC" in the batch operation 1601, generating output data in the GMEM 1020. In this case, the virtual addressable memory of the output data in GMEM 1020 is mapped to physical PCIe addresses.

In order to perform the first memory to memory transfer "1" of the data from the GMEM 1020 directly to the RMEM 1018, depicted in batch operation 1601 as G→R, the CPU 1002 dynamically programs the DMA engine 1024 to directly transfer data between the mapped physical PCIe addresses to corresponding addresses in the RMEM 1018. The CPU 1002 then prompts the DMA engine 1024 to perform the first memory to memory transfer "1" of the data from the GMEM 1020 directly to the RMEM 1018, depicted in batch operation 1601 as G→R. The RDU 1004 executes a second part of the application using the transferred data as input data, labeled "RC" in the batch operation 1601, generating output data which is stored in the RMEM 1018. A final data transfer "2" may be performed by the RDU 1004 or the CPU 1002, depicted in batch operation 1601 as R→C, to transfer the output data stored in the RMEM 1018 back to the HMEM 1016 for evaluation or examination by the CPU 1002.

Figure 17:
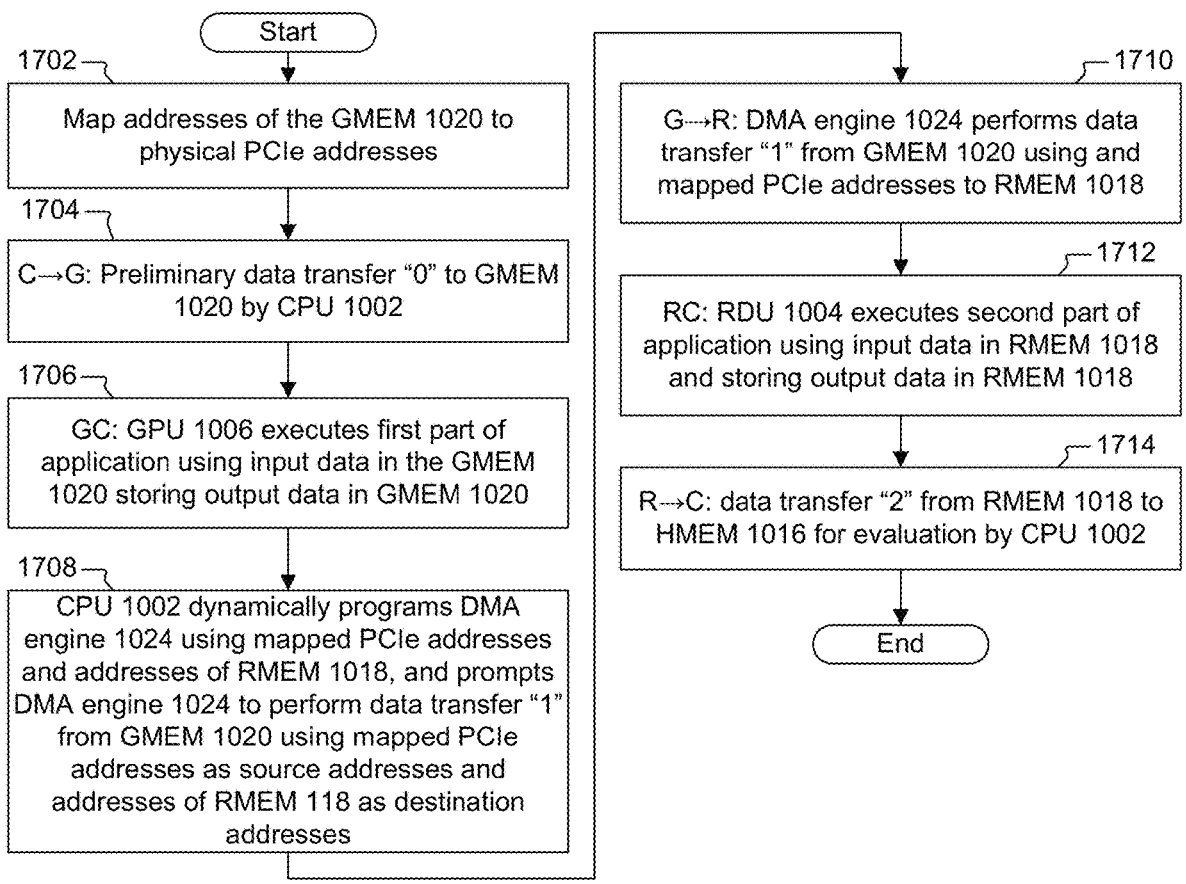
FIG. 17 is a flowchart diagram illustrating operation of the batch operation of FIG. 16.

FIG. 17 is a flowchart diagram illustrating operation of the heterogeneous processing system 1000 performing the batch operation 1601 using one memory to memory transfer operation according to one implementation. Operation may begin by mapping addresses of the GMEM 1020 to physical PCIe addresses (1702). As previously described, the virtual addressable memory of the output data in GMEM 1020 is mapped to physical PCIe addresses. In one implementation, only that portion of the GMEM 1020 for writing output data from the GPU 1006 is mapped.

The DMA engine of the CPU 1002 or the GPU 1006 may first perform a preliminary data transfer "0" to the GMEM 1020 for providing initial input data for the GPU 1006, denoted C→G in the batch operation 1601 (1704). The GPU 1006 executes the first part of the application, denoted "GC" in the batch operation 1601, using the input data stored in the GMEM 1020 and generates output data stored in the GMEM 1020 (1706). In order to perform the first memory to memory data transfer "1" from the GMEM 1020 to the RMEM 1018 denoted G→R in the batch operation 1601, the CPU 1002 dynamically programs the DMA engine 1024 using mapped PCIe addresses and addresses of RMEM 1018, and prompts the DMA engine 1024 to perform the first memory to memory data transfer "1" using the mapped PCIe addresses as source addresses and addresses of the RMEM 1018 as destination addresses (1708). In response, the DMA engine 1024 performs the first memory to memory data transfer "1" G→R from the GMEM 1020 using the mapped PCIe addresses to the RMEM 1018 (1710).

The RDU 1004 then executes the second part of the application, denoted "RC" in the batch operation 1601, using the input data from the RMEM 1018 transferred from the GPU 1006 and stores output data in the RMEM 1018 (1712). Finally, if desired, output data generated by the RDU 1004 and stored in the RMEM 1018 may be transferred back to the HMEM 1016 for evaluation or examination by the CPU 1002 (1714), which is memory to memory data transfer "2" denoted R→C in the batch operation 1601, and operation is completed.

Figure 18:
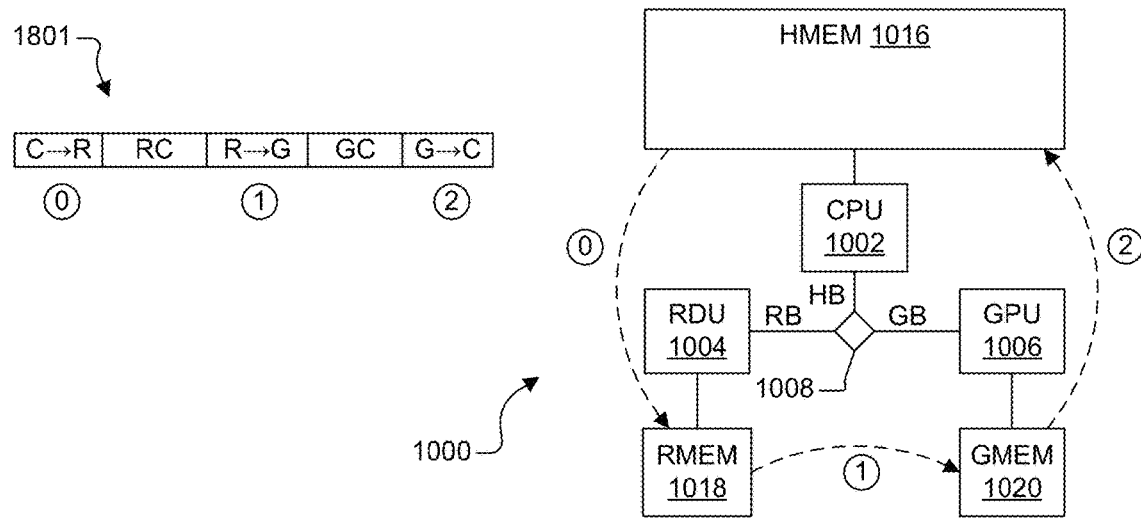
FIG. 18 depicts the heterogeneous processing system of FIG. 10 in simplified form performing a batch operation of a corresponding application using one memory to memory transfer operation according to one implementation.

FIG. 18 depicts the heterogeneous processing system 1000 in simplified form performing a batch operation 1801 of a corresponding application using one memory to memory transfer operation according to one implementation. The batch operation 1801 is substantially similar to the batch operation 1601 except that data flows in the opposite direction. Again, dashed-line arrows indicate data flow and circled numeric designations illustrate memory to memory data transfers during operation of the batch operation 1801. Also, the arrows and circled numeric designations coincide. The DMA engine of the CPU 1002 or the RDU 1004 may perform a preliminary data transfer "0" moving initial input data from the HMEM 1016 to the RMEM 1018 depicted in the batch operation 1801 as C→R. The RDU 1004 executes a first part of the application depicted as "RC" in the batch operation 1801, generating output data in the RMEM 1018. Again, the virtual addressable memory of the output data in GMEM 1020 is mapped to physical PCIe addresses.

In order to perform the first memory to memory transfer "1" of the data from the RMEM 1018 directly to the GMEM 1020, depicted in batch operation 1801 as R→G, the CPU 1002 dynamically programs the DMA engine 1024 to directly transfer data between the RMEM 1018 and the mapped physical PCIe addresses. The CPU 1002 prompts the DMA engine 1024 to perform the first memory to memory transfer "1" of the data from the RMEM 1018 directly to the GMEM 1020, depicted in batch operation 1801 as R→G. The GPU 1006 executes a second part of the application using the transferred data as input data, labeled "GC" in the batch operation 1801, generating output data which is stored in the GMEM 1020. A final data transfer "2" may be performed, depicted in batch operation 1801 as G→C, to transfer the output data stored in the GMEM 1020 back to the HMEM 1016 for evaluation or examination by the CPU 1002. The final transfer may be performed by the DMA engine of the CPU 1002 or of the GPU 1006.

Figure 19:
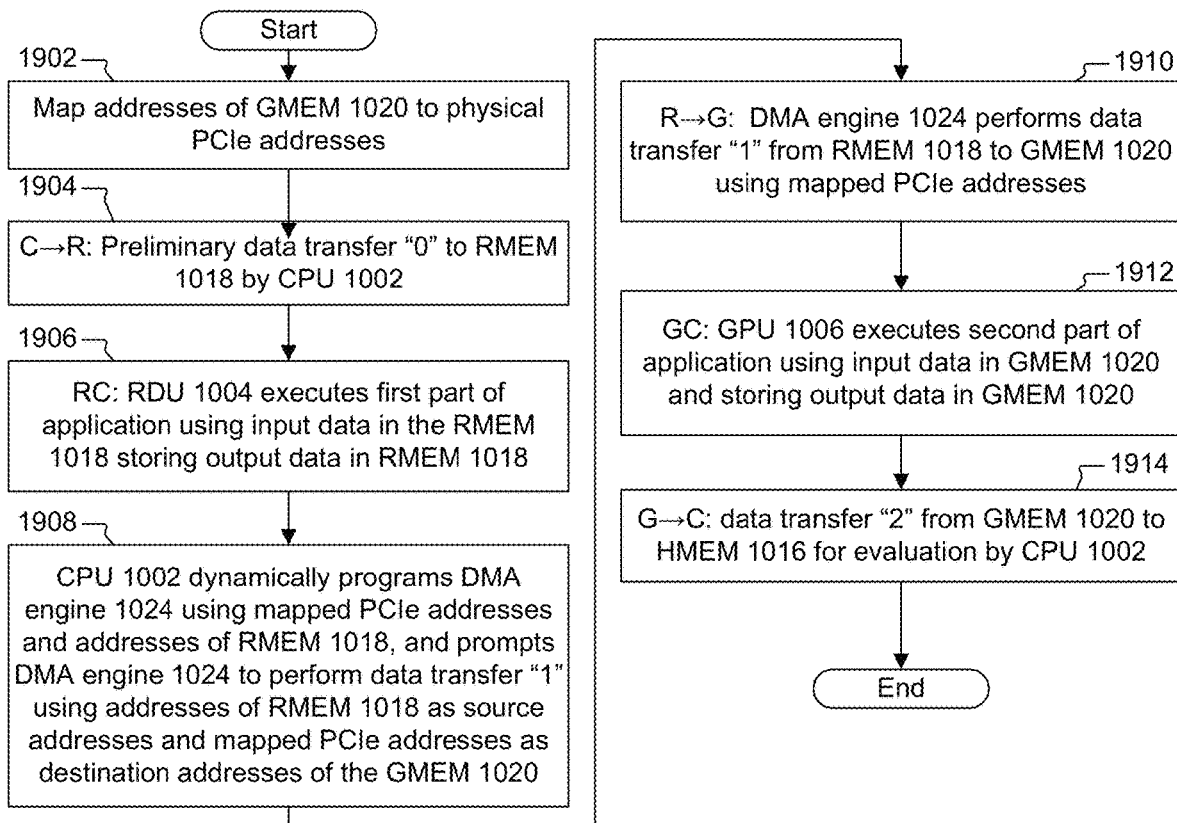
FIG. 19 is a flowchart diagram illustrating operation of the batch operation of FIG. 18.

FIG. 19 is a flowchart diagram illustrating operation of the heterogeneous processing system 1000 performing the batch operation 1801 using one memory to memory transfer operation according to one implementation of the present disclosure. Operation may begin by mapping addresses of the GMEM 1020 to physical PCIe addresses (1902). As previously described, the virtual addressable memory of the GMEM 1020 is mapped to physical PCIe addresses. In one implementation, only that portion of the GMEM 1020 for writing data is mapped.

The DMA engine of the CPU 1002 or the RDU 1004 may first perform a preliminary data transfer "0" to the RMEM 1018 for providing initial input data for the RDU 1004, denoted C→R in the batch operation 1801 (1904). The RDU 1004 executes the first part of the application, denoted "RC" in the batch operation 1801, using the input data stored in the RMEM 1018 and generates output data stored in the RMEM 1018 (1906). In order to perform the first memory to memory data transfer "1" from the RMEM 1018 to the GMEM 1020 denoted R→G in the batch operation 1801, the CPU 1002 dynamically programs the DMA engine 1024 using mapped PCIe addresses and addresses of RMEM 1018, and prompts the DMA engine 1024 to perform the first memory to memory data transfer "1" using the mapped PCIe addresses as source addresses and addresses of the RMEM 1018 as destination addresses (1908). In response, the DMA engine 1024 performs the first memory to memory data transfer "1" R→G from the RMEM 1018 to the GMEM 1020 using the mapped PCIe addresses (1910).

The GPU 1006 then executes the second part of the application, denoted "GC" in the batch operation 1801, using the input data from the GMEM 1020 transferred by the RDU 1004 and stores output data in the GMEM 1020 (1912). Finally, if desired, output data generated by the GPU 1006 and stored in the GMEM 1020 may be transferred back to the HMEM 1016 for evaluation or examination by the CPU 1002 (1914), which is memory to memory data transfer "2" denoted G→C in the batch operation 1801, and operation is completed.

The memory extension achieved by addressable memory mapping enables the RDU 1004 to directly access memory of other processors or accelerators or the like, such as, for example, the GMEM 1020 of the GPU 1006. The phrase "directly access" as used herein means to directly read or to directly write depending upon the memory operation being performed. In this manner, the RDU 1004 can directly read input data from and write output data to addressable memory of the GPU 1006. In such a heterogeneous processing system 1000, the memory extension of the RDU 1004 enables users to avoid any explicit host-initiated data transfer operations between the RDU 1004 and the GPU 1006. Memory to memory data transfers using the host memory HMEM 1016 are avoided.

Figure 20:
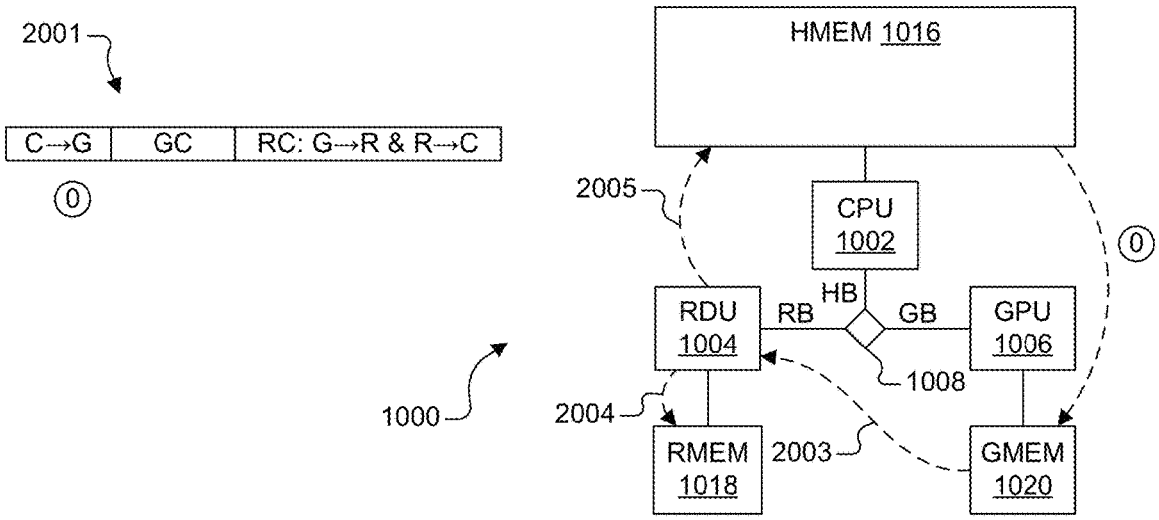
FIG. 20 depicts the heterogeneous processing system of FIG. 10 in simplified form performing a batch operation of a corresponding application using memory extension operation according to one implementation.

FIG. 20 depicts the heterogeneous processing system 1000 in simplified form performing a batch operation 2001 of a corresponding application using memory extension operation according to one implementation. Again, dashed-line arrows indicate data flow and circled numeric designations illustrate memory to memory data transfers during operation of the batch operation 2001. In this case, however, the arrows and circled numeric designations do not coincide because memory to memory data transfers between GMEM 1020 and RMEM 1018 are effectively eliminated. Instead, the memory extension operation enables direct memory access (direct read or direct write). Preliminary and Post data transfers to and from the host memory HMEM 106 may still be used.

The DMA engine of the CPU 1002 or the GPU 1006 may perform a preliminary data transfer "0" moving initial input data from the HMEM 1016 to the GMEM 1020 depicted in the batch operation 2001 as C→G. The GPU 1006 executes a first part of the application, depicted as "GC" in the batch operation 2001, using input data in the GMEM 1020 and generating output data also stored in the GMEM 1020. As with the batch operation 1801, the virtual addressable memory of the output data in GMEM 1020 is mapped to physical PCIe addresses for the batch operation 2001. In this case, however, the runtime logic 1028 of the CPU 1002 configures the compute engine 1032 of the RDU 1004 to use the mapped PCIe physical addresses to directly read the output data stored in the GMEM 1020. The RDU 1004 executes a second part of the application directly reading the output data stored in the GMEM 1020 as shown by arrow 2003 from GMEM 1020 to the RDU 1004.

In one implementation, the output data generated by the RDU 1004 may be written into the RMEM 1018 in a similar manner as previously described for previous batch operations as indicated by arrow 2004. In another implementation, the runtime logic 1028 of the CPU 1002 may additionally program the compute engine 1032 of the RDU 1004 to directly write the output data into the HMEM 1016 as indicated by arrow 2005. It is noted that the virtual addressable memory of where the data is to be located in the HMEM 1016 may be mapped to physical PCIe addresses (as part of the initial step). Since the RDU 1004 directly reads data from the memory (e.g., GMEM 1020) of one processor (e.g., the GPU 1006) and directly writes the data to the memory (e.g., HMEM 1016) of another processor (e.g., the CPU 1002), memory to memory data transfers are entirely avoided. The combined operation of execution by the RDU 1004 and direct storage of output data into the HMEM 1016 is depicted as "RC: G→R & R→C" in the batch operation 2001.

Figure 21:
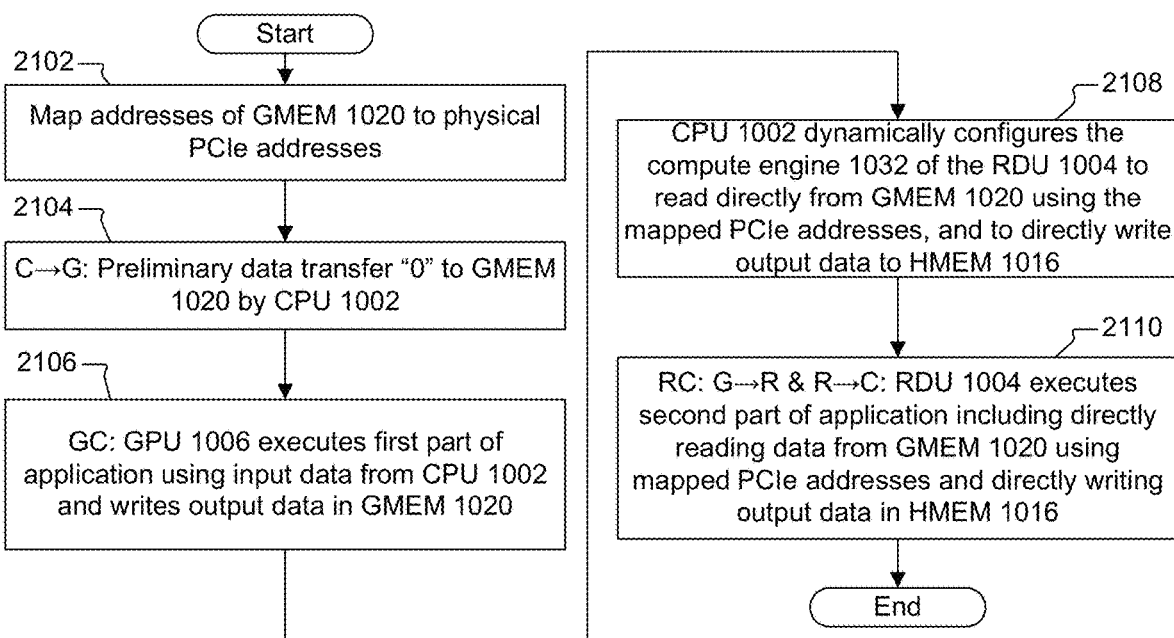
FIG. 21 is a flowchart diagram illustrating operation of the batch operation of FIG. 20.

FIG. 21 is a flowchart diagram illustrating operation of the heterogeneous processing system 1000 performing the batch operation 2001 using memory extension operation according to one implementation. Operation may begin by mapping addresses of the GMEM 1020 to physical PCIe addresses (2102). As previously described, the virtual addressable memory of the output data in GMEM 1020 is mapped to physical PCIe addresses. In one implementation, only that portion of the GMEM 1020 for writing output data from the GPU 1006 is mapped. Also, as part of the initial step, it is noted that the virtual addressable memory of where the data is to be located in the HMEM 1016 may be mapped to a physical PCIe addresses. The DMA engine of the CPU 1002 or the GPU 1006 may first perform a preliminary data transfer "0" to the GMEM 1020 for providing initial input data for the GPU 1006 (2104), denoted C→G in the batch operation 2001. The GPU 1006 executes the first part of the application, denoted "GC" in the batch operation 2001, using the input data from the GMEM 1020 and writes output data in the GMEM 1020 (2106).

The CPU 1002 dynamically configures the compute engine 1032 of the RDU 1004 to read directly from the GMEM 1020 using the mapped PCIe addresses (2108); in addition, the RDU 1004 may be programmed to directly write output data into the HMEM 1016 (2108). Alternatively, the RDU 1004 may be programmed to write the output data into the RMEM 1018 as previously described. The programming of the RDU 1004 by the CPU 1002 may occur at any time before actual data transfer, including, for example, while the GPU 1006 is executing the first part of the application (GC). The RDU 1004 then executes the second part of the application, denoted "RC: G→R & R→C" in the batch operation 2001, including directly reading the data from the GMEM 1020 using the mapped PCIe addresses (2110) and directly writing output data generated by the RDU 1004 into the HMEM 1016 using programmed addresses (2110), and operation is completed.

Figure 22:
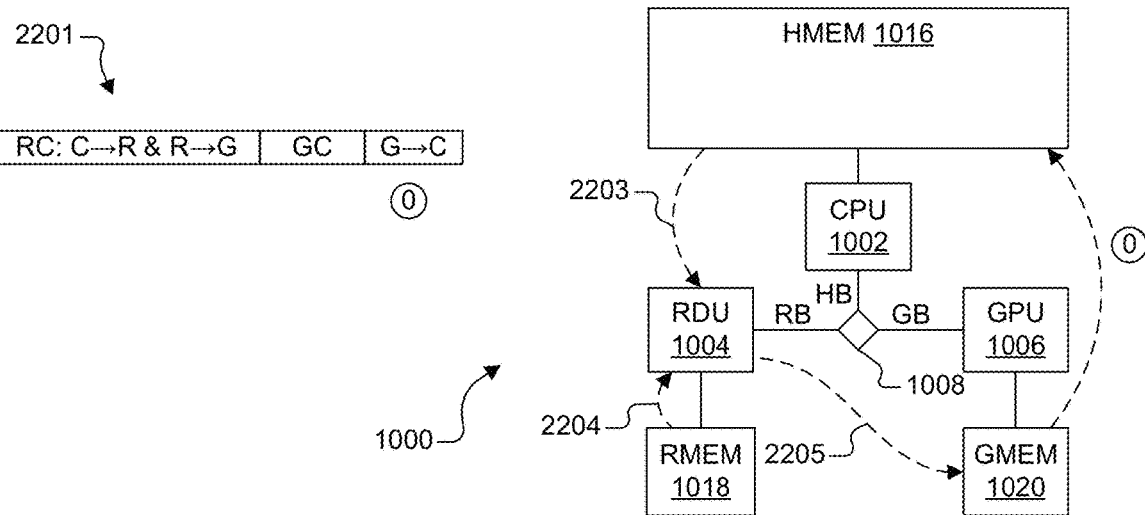
FIG. 22 depicts the heterogeneous processing system of FIG. 10 in simplified form performing a batch operation of a corresponding application using memory extension operation according to one implementation.

FIG. 22 depicts the heterogeneous processing system 1000 in simplified form performing a batch operation 2201 of a corresponding application using memory extension operation according to one implementation. The batch operation 2201 is substantially similar to the batch operation 2001 except in the reverse direction. Again, dashed-line arrows indicate data flow and circled numeric designations illustrate memory to memory data transfers during operation of the batch operation 2201, and again, the arrows and circled numeric designations do not coincide because memory to memory data transfers are effectively eliminated (with the possible exception of an initial CPU data transfer).

As with previously described batch operations, the virtual addressable memory of the output data in GMEM 1020 is mapped to physical PCIe addresses for the batch operation 2201 including mapping of the HMEM 106 to physical PCIe addresses. In this case, the runtime logic 1028 of the CPU 1002 programs the compute engine 1032 of the RDU 1004 to directly read from the HMEM 1016 as indicated by arrow 2203, and to directly write the output data into the GMEM 1020 using the mapped PCIe physical addresses as indicated by arrow 2205, while executing a first part of the application, collectively denoted "RC: C→R & R→G" in the batch operation 2201. Alternatively, the RDU 1004 may be configured to read input data from the RMEM 1018 as indicated by arrow 2204 (which may include a preliminary data transfer from HMEM 1016 into RMEM 1018). The GPU 1006 executes a second part of the application reading input data in the GMEM 1020 stored as the output data from the RDU 1004, and writes output data in the GMEM 1020. A final data transfer operation "0" may be performed to write the output data to the HMEM 1016 for examination by the CPU 1002.

Figure 23:
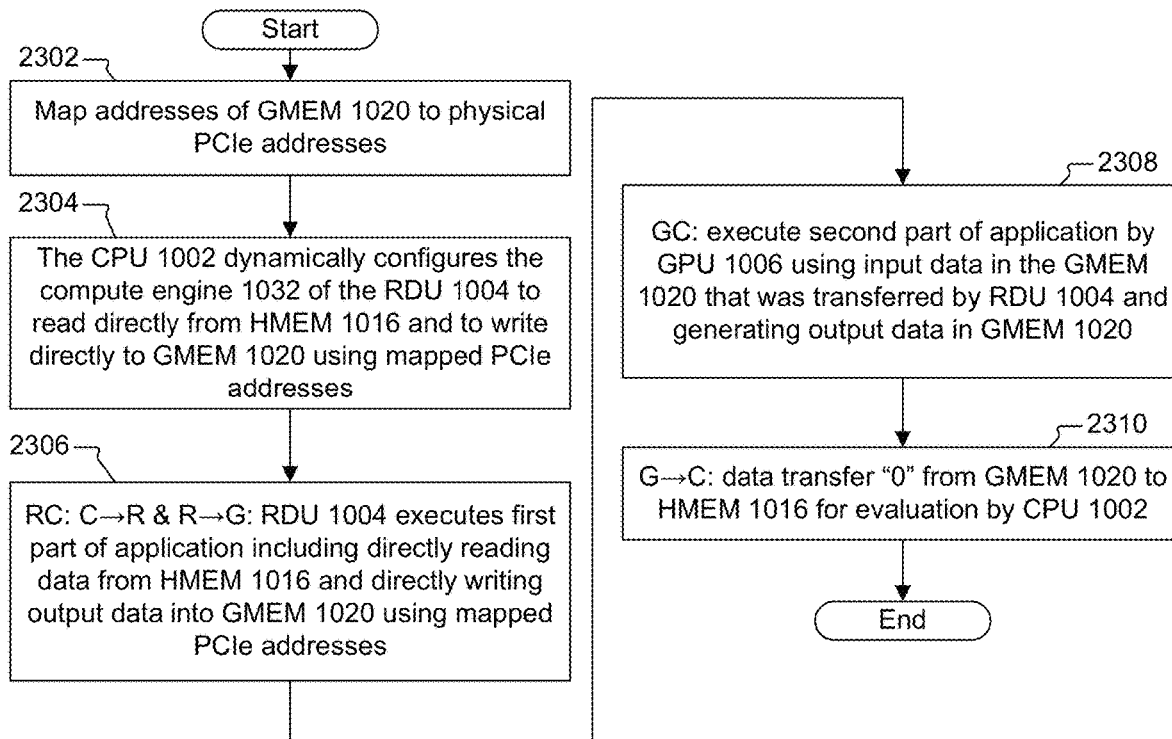
FIG. 23 is a flowchart diagram illustrating operation of the batch operation of FIG. 22.

FIG. 23 is a flowchart diagram illustrating operation of the heterogeneous processing system 1000 performing the batch operation 2201 using memory extension operation according to one implementation of the present disclosure. Operation may begin by mapping addresses of the GMEM 1020 to physical PCIe addresses (2302). As previously described, the virtual addressable memory of the output data in GMEM 1020 is mapped to physical PCIe addresses. In one implementation, only that portion of the GMEM 1020 used for writing output data from the RDU 1004 is mapped. Also, as part of the initial step, it is noted that the virtual addressable memory of where the data is to be retrieved from the HMEM 1016 may be mapped to a physical PCIe addresses. Also, in one embodiment, only that portion of the HMEM 1016 need be mapped.

The CPU 1002 dynamically configures the compute engine 1032 of the RDU 1004 to read directly from the HMEM 1016 and to write directly to the GMEM 1020 using the mapped PCIe addresses (2304). The RDU 1004 executes the first part of the application reading input data from the HMEM 1016 and writing output data stored in the GMEM 1020 (2306), denoted as "RC: C→R & R→G" in the batch operation 2201. Alternatively, the input data may be read from the RMEM 1018 as previously described. The GPU 1006 then executes the second part of the application, denoted "GC", using input data stored in the GMEM 1020 that was transferred by the RDU 1004 and writing output data in the GMEM 1020 (2308). Finally, if desired, output data generated by the GPU 1006 and written into the GMEM 1020 may be transferred back to the HMEM 1016 for examination or evaluation by the CPU 1002, which is denoted G→C in the batch operation 2101 as data transfer "0" (2310), and operation is completed.

The memory transfer achieved by addressable memory mapping as illustrated in FIGS. 20-23 enables the compute engine 1032 of the RDU 1004 to directly access (directly read from or directly write to) memory of other processors or accelerators or the like, such as, for example, the GMEM 1020 of the GPU 1006 or the HMEM 1016 of the CPU 1002. In this manner, the RDU 1004 can directly read input data from or directly write output data to addressable memory of the GPU 1006, or the RDU 1004 can directly read input data from or directly write output data to addressable memory of the CPU 1002. In such a heterogeneous processing system 1000, the memory extension of the RDU 1004 enables users to avoid any explicit host-initiated data transfer operations between the RDU 1004 and the GPU 1006.

Figure 24:
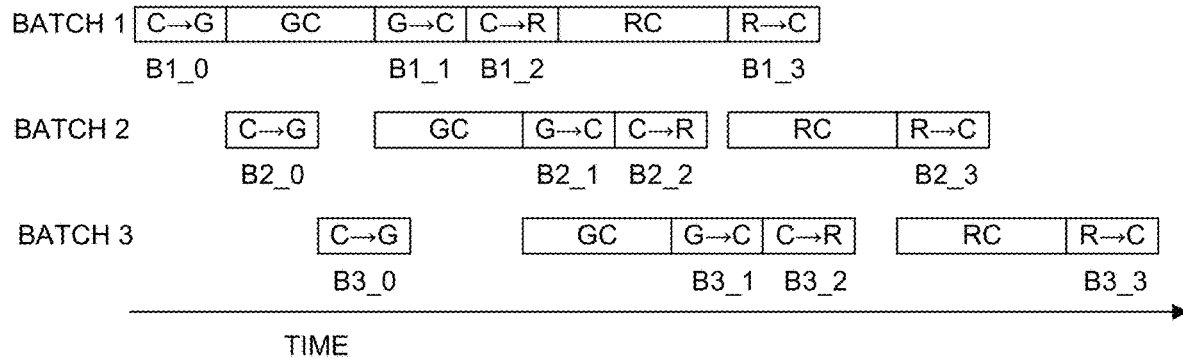
FIG. 24 is a simplified timing diagram depicting overlapping batch operations in time that may be performed by the heterogeneous processing system of FIG. 10 in which each batch operation uses a two memory to memory transfer operation method.

FIG. 24 is a simplified timing diagram depicting overlapping batch operations in time that may be performed by the heterogeneous processing system 1000, in which each batch operation uses a two memory to memory transfer operation method. As shown, three overlapping batch operations BATCH 1, BATCH 2, and BATCH 3 are mapped versus time, each substantially the same as the batch operation 1201 previously described using the same notation ("C→G" depicts a move of data from HMEM 1016 to GMEM 1020, "GC" depicts processing by the GPU 1006, "G→C" depicts a move of data from GMEM 1020 to HMEM 1016, "C→R" depicts a move of data from HMEM 1016 to RMEM, "RC"

depicts computation or processing by the RDU 1004, and "R→C" depicts a move of data from RMEM 1018 to HMEM 1016).

The first batch operation BATCH 1 is shown proceeding without delay between each of the data transfer steps and subsequent processing steps. The data transfer C→G of BATCH 2 is initiated after completion of the data transfer C→G of BATCH 1 and is completed during the processing step GC of BATCH 1. The processing step GC of BATCH 2 begins after completion of the processing step GC of BATCH 1, followed by G→C and C→R, and the processing step RC of BATCH 2 begins after completion of the processing step RC of BATCH 1, which is then followed by R→C. The data transfer C→G of BATCH 3 is initiated after completion of the data transfer C→G of BATCH 2. The processing step GC of BATCH 3 begins after completion of the processing step GC of BATCH 2, followed by G→C and C→R, and the processing step RC of BATCH 3 begins after completion of the processing step RC of BATCH 2, which is then followed by R→C. Operation of overlapping batch operations each similar to the batch operation 1401 is substantially similar but in the opposite direction.

The notations B1_0, B2_0, and B3_0 denote the data transfer operation C→G of the batch operations BATCH 1, 2, and 3, respectively, the notations B1_1, B2_1, and B3_1 denote the data transfer operation G→C of the batch operations BATCH 1, 2, and 3, respectively, the notations B1_2, B2_2, and B3_2 denote the data transfer operation C→R of the batch operations BATCH 1, 2, and 3, respectively, and the notations B1_3, B2_3, and B3_3 denote the data transfer operation R→C of the batch operations BATCH 1, 2, and 3, respectively.

Figure 25:
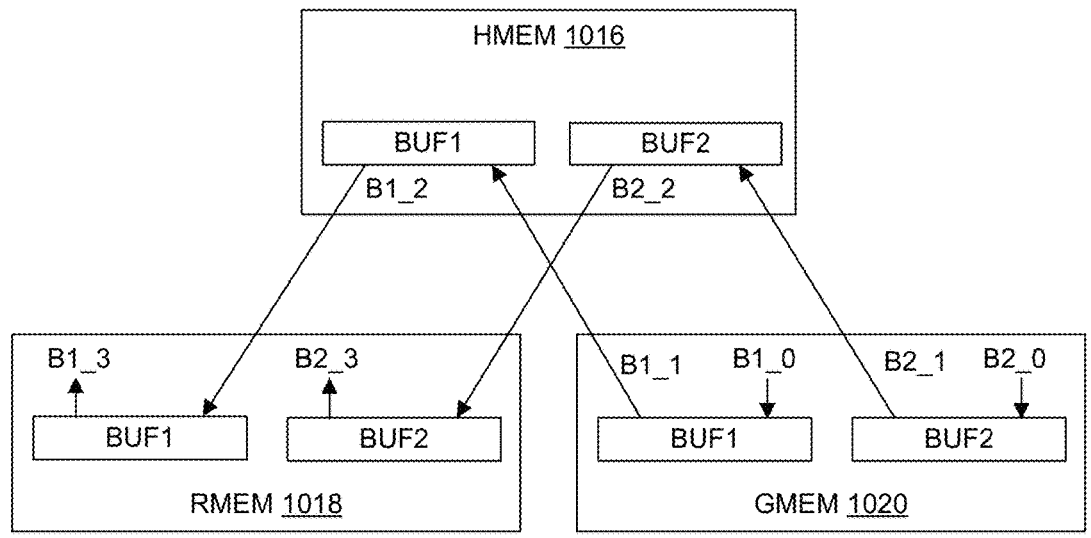
FIG. 25 is a simplified block diagram illustrating buffer utilization within the processor memories for performing the batch operations of FIG. 24.

FIG. 25 is a simplified block diagram illustrating buffer utilization within the memories HMEM 1016, RMEM 1018, and GMEM 1020 for performing the batch operations BATCH 1 and BATCH 2 of FIG. 24. Although not shown, BATCH 2 is handled in similar manner. Two separate buffers BUF1 and BUF2 are allocated in each memory for the corresponding batch operations BATCH 1 and BATCH 2, respectively. An arrow labelled B1_0 denotes transfer of data into BUF1 of GMEM 1020, such as from a memory location (not shown) of the HMEM 1016. The GPU 1006 performs GC on the data in BUF1, and may store updated data back into BUF1 of GMEM 1020. An arrow labelled B2_0 denotes transfer of data into BUF2 of GMEM 1020, such as from another memory location (not shown) of the HMEM 1016, in which the data transfer B2_0 is performed after B1_0 as shown in FIG. 24. The GPU 1006 performs GC on the data in BUF2 after performing GC on the data in BUF1, and may store updated data back into BUF2 of GMEM 1020. An arrow labelled B1_1 denotes transfer of updated data from BUF1 of GMEM 1020 into BUF1 of HMEM 1016, and then another arrow labelled B1_2 denotes transfer of the data in BUF1 of HMEM 1016 into BUF1 of RMEM 1018. In similar manner, an arrow labelled B2_1 denotes transfer of updated data from BUF2 of GMEM 1020 into BUF2 of HMEM 1016, and then another arrow labelled B2_2 denotes transfer of the data in BUF2 of HMEM 1016 into BUF2 of RMEM 1018. The RDU 1004 performs RC on the data in BUF1 of RMEM 1018, and may store updated data back into BUF1 of RMEM 1018. Then RDU performs RC on the data in BUF2 of RMEM 1018, and may store updated data back into BUF2 of RMEM 1018. Arrows labelled B1_3 and B2_3 denotes transfer of updated data from BUF1 and BUF2 of RMEM 1018 to other memory locations (not shown) of HMEM 1016. It is noted that in each case, the input and output regions can be shared if so determined by the compiler or if the sizes are the same, or may be stored in mutually exclusive locations if so determined by the compiler or if the sizes are different.

Figure 26:
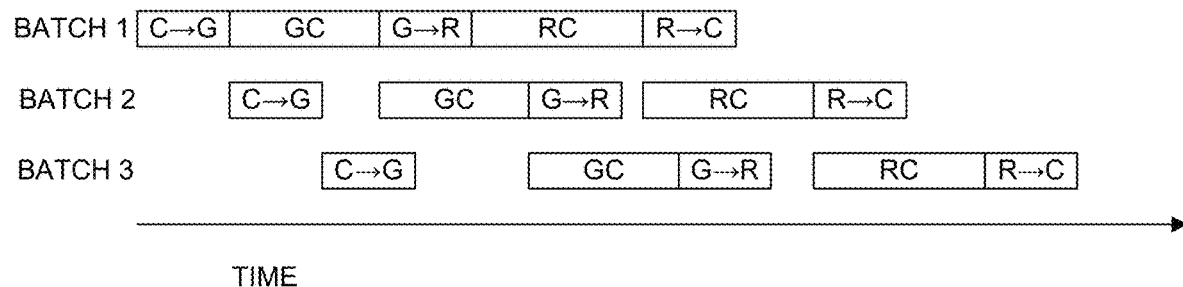
FIG. 26 is a simplified timing diagram depicting overlapping batch operations in time that may be performed by the heterogeneous processing system of FIG. 1 in which each batch operation uses a one memory to memory transfer operation method.

FIG. 26 is a simplified timing diagram depicting overlapping batch operations in time that may be performed by the heterogeneous processing system 1000, in which each batch operation uses a one memory to memory transfer operation method. As shown, three overlapping batch operations BATCH 1, BATCH 2, and BATCH 3 are mapped versus time, each substantially the same as the batch operation 1601 previously described using the same notation. Operation is substantially similar to the overlapping batch operations shown in FIG. 24, except that the two data transfer operations G→C and C→R are replaced by one data transfer operation G→R in each of the batch operations BATCH 1-3. This is because the intermediate buffer transfer using the HMEM 1016 is bypassed as shown in FIG. 16. Operation of overlapping batch operations each similar to the batch operation 1801 is substantially similar but in the opposite direction.

Figure 27:
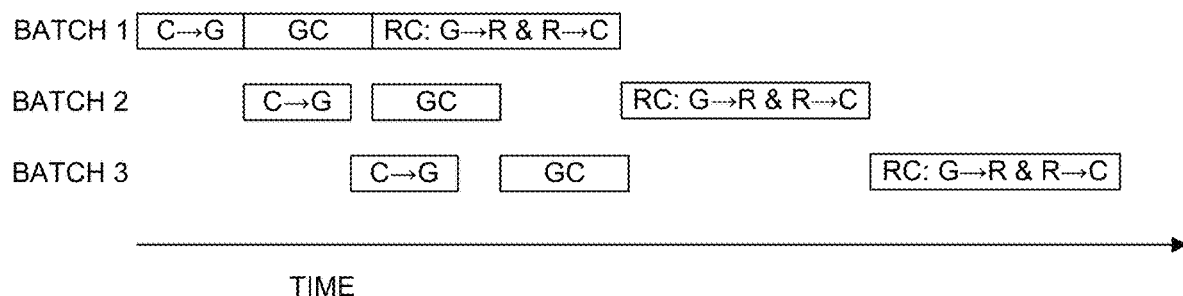
FIG. 27 is a simplified timing diagram depicting overlapping batch operations in time that may be performed by the heterogeneous processing system of FIG. 10 in which each batch operation is performed using memory extension operation.

FIG. 27 is a simplified timing diagram depicting overlapping batch operations in time that may be performed by the heterogeneous processing system 1000, in which each batch operation is performed using memory extension operation. As shown, three overlapping batch operations BATCH 1, BATCH 2, and BATCH 3 are mapped versus time, each substantially the same as the batch operation 2001 previously described using the same notation. As previously described, the intermediate data transfer operations between the memories GMEM 1020 and RMEM 1018 are avoided since the RDU 1004 is configured to directly read data from the memory (e.g., GMEM 1020) of one processor (e.g., the GPU 1006) and may further directly write the data to the memory (e.g., HMEM 1016) of another processor (e.g., the CPU 1002). GC performed by the GPU 1006 for each subsequent batch operation is only delayed by GC of the previous batch operation. Also, the combined RC and data access functions performed by the RDU 1004 for each subsequent batch operation is only delayed by the combined RC and data transfer functions performed by the RDU 1004 for the prior batch operation. Operation of overlapping batch operations each similar to the batch operation 2201 is substantially similar but in the opposite direction.

Figure 28:
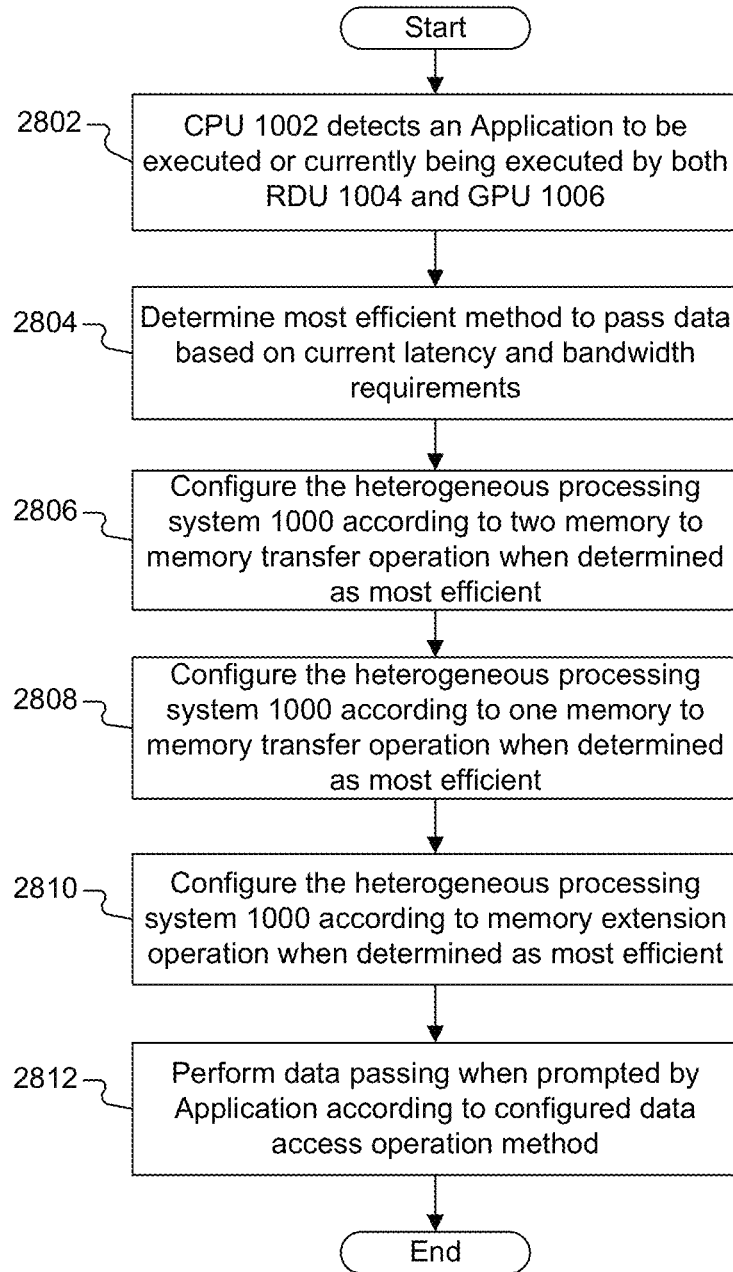
FIG. 28 is a flowchart diagram illustrating a process performed by the CPU of FIG. 10 during operation of the heterogeneous processing system for determining the most efficient data transfer method according to one implementation.

FIG. 28 is a flowchart diagram illustrating a process performed by the CPU 1002 during operation of the heterogeneous processing system 1000 for determining the most efficient data access method according to one implementation. The CPU 1002 detects an application that is to be executed, or that is currently executing, on both the RDU 1004 and the GPU 1006 (2802). Generally, this means that a part of the application is performed on the RDU 1004 and another part on the GPU 1006 in either order (e.g., first part of application executed on the RDU 1004 and second part on the GPU 1006, or vice-versa). In addition, this provides an indication that data may need to be accessed or transferred between RDU 1004 and GPU 1006 in either direction, or between the corresponding memories GMEM 1020 and the RMEM 1018 in either direction, or between a memory of one processor to the other processor and vice-versa. Such indication of data access may be provided by commands or instructions or the like provided by, or from applications executing on, any one of the processing units including the CPU 1002, the RDU 1004, or the GPU 1006, or indications by any one of the data transfer devices such as the DMA engines 1022, 1024, and 1026.

The CPU 1002 then determines the most efficient data access method to pass data based on current latency and bandwidth requirements and the like (2804). In one configuration, the CPU 1002 uses user-defined metadata of data passing, such as the source and destination device types, the memory addresses on both sides of the data passing, the bandwidth of the application defined pipeline and latency requirement of operation device stages, the number of configured common or multiple buffers of the buffer space 1202, among other operating parameters, to determine the optimal data passing method of the input or output tensor. The available data access methods have been previously described, including the two memory to memory transfer operation, the one memory to memory transfer operation, or the memory extension operation (without data transfer).

The CPU 1002 then configures the heterogeneous processing system 1000 according to the most efficient method to orchestrate and complete memory passing between source and target devices. Thus, the CPU 1002 configures the heterogeneous processing system 1000 according to the two memory to memory transfer operation when determined as most efficient (2806). Alternatively, the CPU 1002 configures the heterogeneous processing system 1000 according to the one memory to memory transfer operation when determined as most efficient (2808). Alternatively, the CPU 1002 configures the heterogeneous processing system 1000 according to memory extension operation when determined as most efficient (2810). Once configured, the heterogeneous processing system 1000 proceeds to pass data when prompted by the application according to the configured data access operation method (2812) and operation is completed.

Further or Additional Considerations

We describe various implementations of a method and apparatus for accessing or transferring data between accessible memories of multiple processors in a heterogeneous processing system.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GrPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

Clauses

1. A heterogeneous processing system, comprising:
a host processor coupled to a host memory;
a first processor coupled to a first memory;
a second processor coupled to a second memory;
a plurality of data transfer resources; and
switch and bus circuitry that communicatively couples the host processor, the first processor, the second processor, and the plurality of data transfer resources;
wherein the host processor is configured to detect an application for execution by both the first processor and the second processor, to select one of a plurality of different data access methods for accessing data between the first and second processors, and to configure the heterogeneous processing system based on the selected data access method.

2. The heterogeneous processing system of clause 1, wherein the host processor selects memory extension operation by mapping virtual addresses of the second memory to physical addresses of the switch and bus circuitry and by configuring the first processor to directly access the second memory using the mapped physical addresses according to the memory extension operation.
3. The heterogeneous processing system of clause 2, wherein the second processor is programmed to execute a first part of the application to generate and write first data into the second memory, and wherein the first processor is configured to directly access the first data from the second memory while executing a second part of the application using the first data.
4. The heterogeneous processing system of clause 3, wherein the first processor is configured to directly access the host memory and to write second data output from executing the second part of the application directly into the host memory.
5. The heterogeneous processing system of clause 2, wherein the first processor is configured to execute a first part of the application to generate first data and to directly write the first data into the second memory.
6. The heterogeneous processing system of clause 2, wherein the first processor is configured to directly read first data from the host memory while executing a first part of the application using the first data to generate second data and to directly write the second data into the second memory while executing the first part of the application.
7. The heterogeneous processing system of clause 1, wherein the host processor is configured to map virtual addresses of the second memory to physical addresses of the switch and bus circuitry and to configure a first data transfer resource to perform a one memory to memory transfer operation between the first memory and the second memory.
8. The heterogeneous processing system of clause 7, wherein the host processor is configured to program the first data transfer resource to directly transfer data between the first memory and the second memory using the mapped physical addresses.
9. The heterogeneous processing system of clause 7, wherein the second processor is programmed to execute a first part of the application to generate and write first data into the second memory, and wherein the host processor is configured to prompt the first data transfer resource to transfer the first data from the second memory to the first memory.
10. The heterogeneous processing system of clause 9, wherein the first processor is configured to execute a second part of the application using the first data and write second data into the first memory, and wherein the host processor is configured to prompt the first data transfer resource to transfer the second data into the host memory.
11. The heterogeneous processing system of clause 7, wherein the first processor is configured to execute a first part of the application to generate and write first data into the first memory, and wherein the host processor is configured to prompt the first data transfer resource to transfer the first data from the first memory to the second memory.
12. The heterogeneous processing system of clause 11, wherein the second processor is programmed to execute a second part of the application using the first data and write second data into the second memory.
13. The heterogeneous processing system of clause 12, wherein the host processor is configured to prompt the second data transfer resource to transfer the second data from the second memory into the host memory.
14. The heterogeneous processing system of clause 1, wherein the host processor selects a two memory to memory transfer operation by allocating buffer space within the host memory, wherein the first processor is configured to execute a first part of the application which generates and writes first data into the first memory, and wherein the host processor is further configured to program the plurality of data transfer resources to transfer the first data from the first memory to the buffer space of the host memory and to transfer the first data from the buffer space of the host memory into the second memory.
15. The heterogeneous processing system of clause 14, wherein the buffer space comprises a common buffer that is allocated within a non-swappable portion of the host memory.
16. The heterogeneous processing system of clause 14, wherein the second processor is configured to execute a second part of the application and to write second data in the second memory, and wherein the host processor is configured to prompt one of the plurality of data transfer resources to transfer the second data from the second memory to the host memory.
17. The heterogeneous processing system of clause 1, wherein the host processor is configured to select the most efficient one of the plurality of different data access methods based on current latency and bandwidth requirements.
18. The heterogeneous processing system of clause 1, wherein the host processor is configured to select the most efficient one of the plurality of different data access methods based on user-defined metadata of data passing, including source and destination device types, memory addresses, and bandwidth of application-defined pipeline and latency requirement of operation device stages.
19. A method of selecting data access method in a heterogeneous system, wherein the heterogeneous system includes a host processor coupled to a host memory, a first processor coupled to a first memory, a second processor coupled to a second memory, a plurality of data transfer resources, and switch and bus circuitry that communicatively couples the host processor, the first processor, the second processor, and the plurality of data transfer resources, and the second data transfer resource, the method comprising:
detecting an application for execution by both the first processor and the second processor;
selecting one of a plurality of different data access methods for accessing data between the first and second processors; and
configuring the heterogeneous processing system according to the selected data access method.
20. The method of clause 19, further comprising:
selecting memory extension operation;
mapping, by the host processor, virtual addresses of the second memory to physical addresses of the switch and bus circuitry; and configuring, by the host processor, the first processor to directly access the second memory using the mapped physical addresses according to the memory extension operation.

21. The method of clause 20, further comprising:
programming the second processor to execute a first part of the application to generate and write first data into the second memory; and
configuring the first processor to directly access the first data from the second memory while executing a second part of the application.

22. The method of clause 21, further comprising configuring the first processor to directly access the host memory and to write second data output from executing the second part of the application directly into the host memory.

23. The method of clause 20, further comprising configuring the first processor to execute a first part of the application to generate first data and to directly write the first data into the second memory.

24 The method of clause 20, further comprising configuring the first processor to directly read first data from the host memory while executing the application using the first data to generate second data and to directly write the second data into the second memory while executing the application.

25. The method of clause 19, further comprising:
selecting one memory to memory transfer operation;
mapping, by the host processor, virtual addresses of the second memory to physical addresses of the switch and bus circuitry; and
configuring, by the host processor, the first data transfer resource to perform a one memory to memory transfer operation between the first memory and the second memory using mapped addresses.

26. The method of clause 25, wherein the configuring comprises configuring the first data transfer resource to directly transfer data between the first memory and the second memory using mapped physical addresses.

27. The method of clause 25, further comprising:
programming the second processor to execute a first part of the application to generate and write first data into the second memory; and
wherein said configuring comprises configuring the first data transfer resource to transfer the first data from the second memory to the first memory.

28. The method of clause 27, further comprising configuring the first processor to execute a second part of the application using the first data and write second data into the first memory, and prompting the first data transfer resource to transfer the second data into host memory coupled to the host processor.

29. The method of clause 25, further comprising configuring the first processor to execute a first part of the application to generate and write first data into the first memory, and prompting the first data transfer resource to transfer the first data from the first memory to the second memory.

30. The method of clause 29, further comprising programming the second processor to execute a second part of the application using the first data and write second data into the second memory.

31. The method of clause 30, further comprising programming the second processor to prompt a second data transfer resource to transfer the second data from the second memory into the host memory.

32. The method of clause 19, further comprising:
selecting a two memory to memory transfer operation;
allocating buffer space in the host memory;
programming a first data transfer resource with source addresses of the first memory and destination addresses of the buffer space;
programming a second data transfer resource with source addresses of the buffer space and destination addresses of the second memory;
executing a first part of an application by the first processor which generates and writes first data into the first memory;
causing the first data transfer resource to transfer the first data from the first memory to the buffer space of the host memory; and
causing the second data transfer resource to transfer the first data from the buffer space of the host memory to the second memory.

33. The method of clause 32, wherein the allocating buffer space comprises allocating a common buffer within a non-swappable portion of the host memory.

34. The method of clause 32, wherein at least one of the plurality of data transfer resources comprises a direct memory access (DMA) engine and wherein the allocating buffer space comprises allocating the buffer space as DMA addressable memory.

35. The method of clause 32, wherein the first processor comprises a compute engine, further comprising configuring the compute engine by the host processor to execute the first part of the application to generate the first data and to write the first data into the first memory, and causing the first data transfer resource to transfer the first data from the first memory to the buffer space of the host memory.

36. The method of clause 32, wherein the second processor comprises a compute engine, further comprising causing the second data transfer resource to transfer the first data from the buffer space of the host memory to the second memory, and configuring, by the host processor, the compute engine to execute a second part of the application using the first data to generate second data and to write the second data into the second memory.

37. The method of clause 32, wherein the plurality of data transfer resources comprises a first direct memory access (DMA) engine incorporated within the first processor and a second DMA engine incorporated within the second processor, further comprising programming the first DMA engine to transfer the first data from the first memory to the buffer space of the host memory, prompting the first DMA engine after the first data is written into the first memory to transfer the first data from the first memory to the buffer space, programming the second DMA engine to transfer the first data from the buffer space into the second memory, and prompting the second DMA engine after the first data is written into the buffer space of the host memory to transfer the first data from the buffer space to the second memory.

What is claimed is:
1. A heterogeneous processing system, comprising:
switch and bus circuitry;
a host processor coupled to a host memory accessible from the host processor without utilizing the switch and bus circuitry;

a first processor coupled to a first memory accessible from the first processor without utilizing the switch and bus circuitry;
a second processor coupled to a second memory accessible from the second processor without utilizing the switch and bus circuitry; and
a plurality of data transfer resources;
wherein the switch and bus circuitry communicatively couples the host processor, the first processor, the second processor, and the plurality of data transfer resources;
wherein the host processor is configured to, at runtime:
  i) detect an application for execution by both the first processor and the second processor,
  ii) dynamically select one of a plurality of different data access methods for accessing data between the first and second processors based on user-defined metadata of data passing, including:
    source and destination device types,
    memory addresses,
    bandwidth of application-defined pipeline, and
    latency requirement of operation device stages, and
  iii) configure the heterogeneous processing system based on the selected data access method;
wherein the plurality of different data access methods for accessing data between the first and second processors include:
  a) directly accessing the data in the second memory by the first processor,
  b) transferring the data between the first memory and the second memory using a first data transfer resource of the plurality of data transfer resources without passing the data through the host memory, and
  c) transferring the data from the second memory to the host memory and then transferring the data from the host memory to the first memory using one or more data transfer resources of the plurality of data transfer resources.

2. The heterogeneous processing system of claim 1, wherein the host processor selects memory extension operation by mapping virtual addresses of the second memory to physical addresses of the switch and bus circuitry and by configuring the first processor to directly access the second memory using the mapped physical addresses according to the memory extension operation.

3. The heterogeneous processing system of claim 2, wherein the second processor is programmed to execute a first part of the application to generate and write first data into the second memory, and wherein the first processor is configured to directly access the first data from the second memory while executing a second part of the application using the first data.

4. The heterogeneous processing system of claim 3, wherein the first processor is configured to directly access the host memory and to write second data output from executing the second part of the application directly into the host memory.

5. The heterogeneous processing system of claim 2, wherein the first processor is configured to execute a first part of the application to generate first data and to directly write the first data into the second memory.

6. The heterogeneous processing system of claim 2, wherein the first processor is configured to directly read first data from the host memory while executing a first part of the application using the first data to generate second data and to directly write the second data into the second memory while executing the first part of the application.

7. The heterogeneous processing system of claim 1, wherein the host processor is configured to map virtual addresses of the second memory to physical addresses of the switch and bus circuitry and to configure a first data transfer resource to perform a one memory to memory transfer operation between the first memory and the second memory.

8. The heterogeneous processing system of claim 7, wherein the host processor is configured to program the first data transfer resource to directly transfer data between the first memory and the second memory using the mapped physical addresses.

9. The heterogeneous processing system of claim 7, wherein the second processor is programmed to execute a first part of the application to generate and write first data into the second memory, and wherein the host processor is configured to prompt the first data transfer resource to transfer the first data from the second memory to the first memory.

10. The heterogeneous processing system of claim 9, wherein the first processor is configured to execute a second part of the application using the first data and write second data into the first memory, and wherein the host processor is configured to prompt the first data transfer resource to transfer the second data into the host memory.

11. The heterogeneous processing system of claim 7, wherein the first processor is configured to execute a first part of the application to generate and write first data into the first memory, and wherein the host processor is configured to prompt the first data transfer resource to transfer the first data from the first memory to the second memory.

12. The heterogeneous processing system of claim 11, wherein the second processor is programmed to execute a second part of the application using the first data and write second data into the second memory.

13. The heterogeneous processing system of claim 12, wherein the host processor is configured to prompt the second data transfer resource to transfer the second data from the second memory into the host memory.

14. The heterogeneous processing system of claim 1, wherein the host processor selects a two memory to memory transfer operation by allocating buffer space within the host memory, wherein the first processor is configured to execute a first part of the application which generates and writes first data into the first memory, and wherein the host processor is further configured to program the plurality of data transfer resources to transfer the first data from the first memory to the buffer space of the host memory and to transfer the first data from the buffer space of the host memory into the second memory.

15. The heterogeneous processing system of claim 14, wherein the buffer space comprises a common buffer that is allocated within a non-swappable portion of the host memory.

16. The heterogeneous processing system of claim 14, wherein the second processor is configured to execute a second part of the application and to write second data in the second memory, and wherein the host processor is configured to prompt one of the plurality of data transfer resources to transfer the second data from the second memory to the host memory.

17. The heterogeneous processing system of claim 1, wherein the host processor is configured to select a most efficient one of the plurality of different data access methods based on current latency and bandwidth requirements.

18. A method of selecting data access method in a heterogeneous processing system, wherein the heterogeneous processing system includes switch and bus circuitry, a host processor, a first processor, a second processor, a host memory accessible from the host processor without utilizing the switch and bus circuitry, a first memory accessible from the first processor without utilizing the switch and bus circuitry, a second memory accessible from the second processor without utilizing the switch and bus circuitry, a plurality of data transfer resources, wherein the switch and bus circuitry communicatively couples the host processor, the first processor, the second processor, and the plurality of data transfer resources, the method comprising:

detecting, by the host processor at runtime, an application for execution by both the first processor and the second processor;

dynamically selecting, by the host processor at runtime, one of a plurality of different data access methods for accessing data between the first and second processors based on user-defined metadata of data passing, including:

source and destination device types, memory addresses, bandwidth of application-defined pipeline, and latency requirement of operation device stages; and configuring the heterogeneous processing system according to the selected data access method;

wherein the plurality of different data access methods for accessing data between the first and second processors include:

a) directly accessing the data in the second memory by the first processor, b) transferring the data between the first memory and the second memory using a first data transfer resource of the plurality of data transfer resources without passing the data through the host memory, and c) transferring the data from the second memory to the host memory and then transferring the data from the host memory to the first memory using one or more data transfer resources of the plurality of data transfer resources.

19. The method of claim 18, further comprising:

selecting memory extension operation;

mapping, by the host processor, virtual addresses of the second memory to physical addresses of the switch and bus circuitry; and configuring, by the host processor, the first processor to directly access the second memory using the mapped physical addresses according to the memory extension operation.

20. The method of claim 18, wherein the selected data access method utilizes a data transfer resource, the method further comprising:

programming the data transfer resource for a first data transfer; and reprogramming the data transfer resource for a second data transfer.

\* \* \* \* \*